(12) United States Patent  
Hasuike

(10) Patent No.: US 11,929,966 B2  
(45) Date of Patent: Mar. 12, 2024

(54) INFORMATION PROCESSING DEVICE, COMPUTER READABLE MEDIUM AND PROCESS FOR INFORMATION PROCESSING

(71) Applicant: FUJIFILM BUSINESS INNOVATION CORP., Tokyo (JP)

(72) Inventor: Kimitake Hasuike, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 193 days.

(21) Appl. No.: 17/410,390

(22) Filed: Aug. 24, 2021

(65) Prior Publication Data

US 2022/0311718 A1 Sep. 29, 2022

(30) Foreign Application Priority Data

Mar. 26, 2021 (JP) .................. 2021-052852  
Mar. 26, 2021 (JP) .................. 2021-052853

(51) Int. Cl.
*H04L 51/046* (2022.01)  
*G06F 3/0482* (2013.01)  
*G06F 16/13* (2019.01)  
*G06F 21/62* (2013.01)

(52) U.S. Cl.
CPC .......... *H04L 51/046* (2013.01); *G06F 3/0482* (2013.01); *G06F 16/13* (2019.01); *G06F 21/6218* (2013.01)

(58) Field of Classification Search
None  
See application file for complete search history.

(56) References Cited

U.S. PATENT DOCUMENTS

| | | | |
|---|---|---|---|
| 10,110,522 B1* | 10/2018 | Mesters | H04L 51/18 |
| 11,599,369 B1* | 3/2023 | Zuo | G06F 40/197 |
| 2009/0254843 A1* | 10/2009 | Van Wie | H04L 67/131 |
| | | | 707/999.005 |
| 2014/0181697 A1* | 6/2014 | Kirigin | G06F 3/048 |
| | | | 715/758 |

(Continued)

FOREIGN PATENT DOCUMENTS

| | | |
|---|---|---|
| CN | 106648303 B | 6/2019 |
| EP | 1 071 017 A1 | 1/2001 |

(Continued)

OTHER PUBLICATIONS

Feb. 9, 2022 Search Report issued in European Patent Application No. 21196337.6.

(Continued)

*Primary Examiner* — Ryan Barrett  
(74) *Attorney, Agent, or Firm* — Oliff PLC

(57) ABSTRACT

An information processing device includes a processor, and the processor is configured to: associate plural participants of each activity set by a user for each specific purpose with the activity; link a storage area of a file management service for which at least one participant has an access right and that is provided by plural service providers to the activity; and cause a display of a participant of a request source to display a first file stored in a linked storage area for which the participant of the request source has an access right, in response to a request for accessing the activity from each participant.

19 Claims, 14 Drawing Sheets

(56) References Cited

U.S. PATENT DOCUMENTS

| | | | | |
|---|---|---|---|---|
| 2015/0278502 | A1* | 10/2015 | Broms | G06F 21/6218 |
| | | | | 707/783 |
| 2016/0085768 | A1* | 3/2016 | Hashimoto | G06F 21/6218 |
| | | | | 707/737 |
| 2016/0094499 | A1* | 3/2016 | Uraizee | G06F 3/0482 |
| | | | | 715/752 |
| 2018/0095940 | A1 | 4/2018 | Meixner et al. | |
| 2018/0124155 | A1* | 5/2018 | Ryzhkov | G06Q 10/10 |
| 2018/0165260 | A1* | 6/2018 | Soni | G06F 40/197 |
| 2018/0203601 | A1* | 7/2018 | Birchfield | G06F 21/31 |
| 2019/0146646 | A1* | 5/2019 | Hirano | H04L 51/04 |
| | | | | 715/759 |
| 2019/0288902 | A1* | 9/2019 | He | H04L 51/04 |

FOREIGN PATENT DOCUMENTS

| | | | |
|---|---|---|---|
| JP | 4292819 | B2 | 7/2009 |
| JP | 5909459 | B2 | 4/2016 |
| JP | 2018-060508 | A | 4/2018 |
| JP | 2019-185620 | A | 10/2019 |

OTHER PUBLICATIONS

Anonymous; "Open files using storage access framework"; Android Developers; Feb. 4, 2021; XP055885100; <URL:https://web.archive.org/web/20210204170828/https://developer.android.com/guide/topics/providers/document-provider>.

May 19, 2023 Office Action issued in European Patent Application No. 21196337.6.

Nov. 30, 2023 Office Action issued in European Patent Application No. 21196337.6.

* cited by examiner

INFORMATION PROCESSING DEVICE, COMPUTER READABLE MEDIUM AND PROCESS FOR INFORMATION PROCESSING

CROSS-REFERENCE TO RELATED APPLICATIONS

This application is based on and claims priority under 35 USC 119 from Japanese Patent Application No. 2021-052852 filed on Mar. 26, 2021 and Japanese Patent Application No. 2021-052853 filed on Mar. 26, 2021.

BACKGROUND

1. Technical Field

The present invention relates to an information processing device, a computer readable medium storing a program and a process for information processing.

2. Related Art

Japanese Patent No. 5909459 discloses a message transmission and reception support system including a message processing unit that transmits and receives a message via a network. The message processing unit includes a content view that acquires contents from a resource that manages the contents and displays the contents, a sharing unit that specifies resource information about contents that are instructed to be shared in the acquired contents, and a conversation view that transmits a message including the resource information.

Japanese Patent No. 4292819 discloses display of a list of information exchanged by a plurality of communication tools.

SUMMARY

Aspects of non-limiting embodiments of the present disclosure relate to providing, even when a file related to an activity set for a specific purpose is managed by a file management service provided by a service provider, a screen on which a participant of the activity can confirm the file in accordance with an access right of the participant associated with the activity.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor, in which the processor is configured to: associate plural participants of each activity set by a user for each specific purpose with the activity; link, to the activity, a storage area of a file management service for which at least one participant has an access right and that is provided by plural service providers; and cause a display of a participant of a request source to display a first file stored in a linked storage area for which the participant of the request source has an access right, in response to a request for accessing the activity from each participant.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
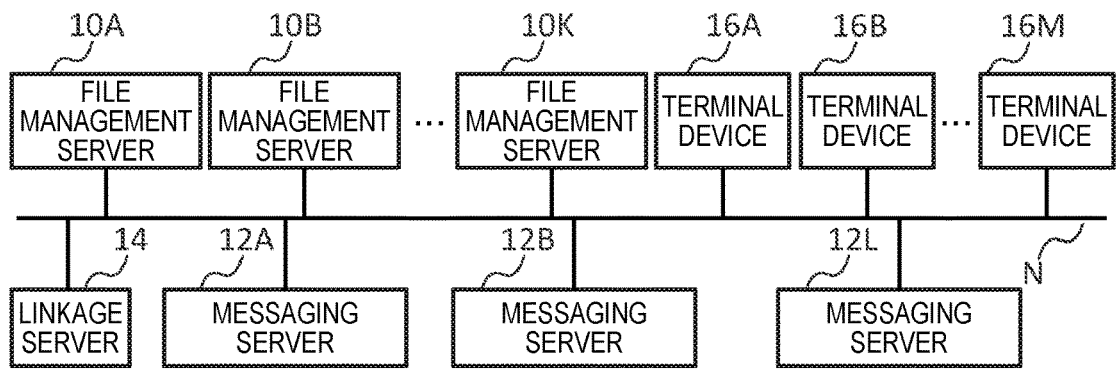
FIG. 1 is a block diagram showing a configuration of an information processing system.

An information processing system according to a first exemplary embodiment will be described with reference to FIG. 1. FIG. 1 shows an example of a configuration of an information processing system according to a first exemplary embodiment.

For example, the information processing system according to the first exemplary embodiment includes a linkage server 14, K (K is an integer equal to or larger than 1) file management servers, L (L is an integer equal to or larger than 1) messaging servers, and M (M is an integer equal to or larger than 1) terminal devices.

In the example shown in FIG. 1, the information processing system according to the first exemplary embodiment includes file management servers 10A, 10B, . . . 10K, messaging servers 12A, 12B, . . . 12L, and terminal devices 16A, 16B, . . . 16M. These are merely examples, and one or plural file management servers, one or plural messaging servers, and one or plural terminal devices are provided in the information processing system according to the first exemplary embodiment.

Hereinafter, in a case where it is not necessary to distinguish the file management servers 10A, 10B, . . . 10K from one another, the file management servers 10A, 10B, . . . 10K are referred to as a "file management server 10". In a case where it is not necessary to distinguish the messaging servers 12A, 12B, . . . 12L from one another, the messaging servers 12A, 12B, . . . 12L are referred to as a "messaging server 12". In a case where it is not necessary to distinguish the terminal devices 16A, 16B, . . . 16M from one another, the terminal devices 16A, 16B, . . . 16M are referred to as a "terminal device 16".

The file management server 10, the messaging server 12, the linkage server 14, and each terminal device 16 have a function of communicating with other devices. The communication may be wired communication using a cable or wireless communication. The wireless communication is, for example, short-range wireless communication, Wi-Fi (registered trademark), and the like. The short-range wireless communication is, for example, Bluetooth (registered trademark), Radio Frequency Identifier (RFID), and the like. Each device may communicate with another device via a communication path N such as a local area network (LAN) or the Internet.

The file management server 10 provides a service for managing files (hereinafter referred to as a "file management service"). For example, the file management server 10 provides one or plural repositories as a file management service, and the repository is an area where a file is stored. The repository is an example of a storage area, and is implemented by, for example, a memory.

An access right that is permission to access the repository and using the repository (hereinafter, referred to as a "first access right") is given to a user in advance. A user uses the terminal device 16 to access a repository for which the user has the first access right, and stores a file in the repository or acquires a file from the repository.

For example, user account information for logging in to the file management server 10 (hereinafter referred to as "first account information") is defined for each user and is registered in the file management server 10. The first account information is, for example, a user ID, a password, biological information of a user, or the like. When a user logs in to the file management server 10, the user uses the terminal device 16 to send the first account information of the user to the file management server 10 and requests login to the file management server 10. The file management server 10 authenticates the user who requested the login by collating the first account information transmitted from the terminal device 16 by the user with the first account information registered in advance in the file management server 10. When the first account information transmitted from the terminal device 16 by the user is registered in the file management server 10, the file management server 10 permits the user to log in to the file management server 10. The user who is permitted to log in logs in to the file management server 10, and the user is permitted to use a repository for which the user has the first access right. When the first account information transmitted from the terminal device 16 by the user is not registered in the file management server 10, the file management server 10 does not permit the user to log in to the file management server 10. In this case, the user is not permitted to log in to the file management server 10 and is not permitted to use the repository. In a control different from the above one, the file management server may permit the user to create a new repository for which the user has access right even when the file management server 10 does not permit the user to log in to the file management server 10. In addition, the file management server 10 may permit the user to use or create a repository regardless of whether the user requests login.

A processing of authenticating the user may be executed by a device (for example, an authentication server) other than the file management server 10. In this case, the file management server 10 receives a result of an authentication processing executed by the authentication server, and permits or does not permit the user to log in to the file management server 10 in accordance with the result.

The file management server 10 may provide a file management service to a user (for example, a guest user) who does not log in to the file management server 10 using the first account information.

The first account information is determined for each file management server 10 or for each file management service, and is registered in each file management server 10. The first account information registered in each file management server 10 may be the same information or different information. For example, the first account information for logging in to the file management server 10A and the first account information for logging in to the file management server 10B may be the same information or different information. The same applies to the first account information registered in the other file management servers 10. The same first account information may be shared by plural file management servers 10 to authenticate a user.

The first access right may be set for each individual repository, or plural repositories may be grouped and managed and the first access right may be set for each of the plural repositories. The first access right for one repository may be set in one piece of first account information, or the first access right for plural repositories may be set in one piece of first account information. Plural different pieces of first account information may be grouped into one group, and a first access right for one or plural repositories may be set in the plural different pieces of first account information (that is, the one group). The first access right may be set or changed when the first account information is registered in the file management server 10, or may be set or changed after the first account information is registered in the file management server 10. A repository in which the first access right is not set may be created, and all users may be permitted to access the repository. The above all users include a user who logged in to the file management server 10 and a user (for example, a guest user) who does not log in to the file management server 10.

A user may use the terminal device 16 to log in to the file management server 10 and use the file management service without using the linkage server 14, and may use the file management service using the linkage server 14 to be described later.

Categories of a file concept include image data, video data, graphic data, audio data such as music data and voice data, document data such as text data, a program, and a combination of at least two of the above kinds of data. A format of the file is not particularly limited, and a file managed by the file management server 10 may be a file having any format. It is needless to say that the format of a file managed by the file management server 10 may be limited, and only a file having a specific format may be managed by the file management server 10.

For example, the file management server 10 is operated by a provider of a file management service. That is, the provider of the file management service provides a file management service by operating the file management server 10. Plural different file management servers 10 may be operated by the same provider. For example, the file management servers 10 may provide different file management services, or plural different file management services may be provided by the same provider. It is needless to say that file management servers 10 may be operated by separate providers, and file management services may be provided by separate providers.

The messaging server 12 provides a service (hereinafter referred to as a "messaging service") for exchanging at least messages among plural users. The message includes a character, a reference numeral and a sign other than a character, an image, a video, a graphic, a sound, or at least two of a character, a reference numeral and a sign other than a character, an image, a video, a graphic, a sound. For example, the messaging service is a service for transmitting and receiving an e-mail, a social networking service (SNS), groupware, a voice call such as a telephone, a service for providing an online conference (for example, a service using a voice, an image, a video, and the like), or a service for providing an online game. The online conference may be referred to as a Web conference, a remote conference, a video conference, or the like.

An access right that is permission to use the messaging service (hereinafter, referred to as a "second access right") is given to a user in advance. The user uses the terminal device 16 to participate in a messaging service for which the user has the second access right, and exchanges a message with another user who uses the messaging service. For example, when the user uses the terminal device 16 to transmit a message to the messaging service, the message is transmitted to the another user who uses the messaging service. For example, the transmitted message is displayed on a display of the terminal device 16, or is emitted from a speaker as a voice.

For example, user account information for logging in to the messaging server 12 (hereinafter referred to as "second account information") is determined for each user and is registered in the messaging server 12. The second account information is, for example, a user ID, a password, biological information of a user, or the like. When a user logs in to the messaging server 12, the user uses the terminal device 16 to transmit the second account information of the user to the messaging server 12, and requests login to the messaging server 12. The messaging server 12 authenticates the user who requested the login by collating the account information transmitted from the terminal device 16 by the user with the account information registered in advance in the messaging server 12. When the second account information transmitted from the terminal device 16 by the user is registered in the messaging server 12, the messaging server 12 permits the user to log in to the messaging server 12. The user who is permitted to log in logs in to the messaging server 12, and the user is permitted to transmit, receive, or read a message. When the second account information transmitted from the terminal device 16 by the user is not registered in the messaging server 12, the messaging server 12 does not permit the user to log in to the messaging server 12. In this case, the user is not permitted to log in to the messaging server 12 and is not permitted to exchange messages.

A processing of authenticating the user may be executed by a device (for example, an authentication server) other than the messaging server 12. In this case, the messaging server 12 receives a result of an authentication processing executed by the authentication server, and permits or does not permit the user to log in to the file management server 12 in accordance with the result.

The messaging server 12 may provide a messaging service to a user (for example, a guest user) who does not log in to the messaging server 12 using the second account information.

The second account information is determined for each messaging server 12 or for each messaging service, and is registered in each messaging server 12. The second account information registered in each messaging server 12 may be the same information or different information. For example, the second account information for logging in to the messaging server 12A and the second account information for logging in to the messaging server 12B may be the same information or different information. The same applies to the second account information registered in the other messaging servers 12. The same second account information may be shared by plural messaging servers 12 to authenticate a user. The same information as the first count information may be used as the second account information.

For example, a group constituted by plural users (for example, a group on an SNS (for example, a group chat), a mailing list (ML), groupware, or the like), a thread or a topic of an electronic bulletin board or the like, a collection of messages related to a specific topic, and the like are determined as channels of the messaging service. A user participates in one or plural channels, and exchanges a message with another user who participates in the same channel. For example, in a messaging service, a channel is formed by a user, an administrator, or the like, and one or plural users are permitted to participate in the channel and exchange messages.

The second access right may be set for each channel, or plural channels may be grouped and managed and the second access right may be set for each of the plural channels. The second access right for one channel may be set in one piece of second account information, or the second access right for plural channels may be set in one piece of second account information. Plural different pieces of second account information may be grouped into one group, and the second access right for one or plural channels may be set in the plural different pieces of second account information (that is, the one group). The second access right may be set or changed when the second account information is registered in the messaging server 12, or may be set or changed after the second account information is registered in the messaging server 12.

A user may use the terminal device 16 to log in to the messaging server 12 and use the messaging service without using the linkage server 14, and may use the messaging service using the linkage server 14 to be described later.

For example, the messaging server 12 is operated by a provider of a messaging service. That is, the provider of the messaging service provides the messaging service by operating the messaging server 12. Plural different messaging servers 12 may be operated by the same provider. For example, the messaging servers 12 may provide different messaging services, or plural different messaging services may be provided by the same provider. It is needless to say that messaging servers 12 may be operated by separate providers, and messaging services may be provided by separate providers.

The linkage server 14 links one or plural services included in one or plural file management services and one or plural messaging services to each activity set by a user for each specific purpose. For example, the linkage server 14 may link one or plural file management services to an activity, may link one or plural messaging services to the activity, or may link one or plural file management services and one or plural messaging services to the activity.

For example, plural users participate in an activity to achieve a specific purpose. Hereinafter, a user participating in an activity will be referred to as a "participant". Examples of an activity include various activities such as a work activity, an exercise activity such as sports, and a hobby activity. For example, a work activity is that plural participants (for example employees, traders, workers, and the like) work, operate, action, or the like on a work project, task, or the like. The specific purpose includes, for example, various purposes such as a work purpose (for example, a purpose of a project or a task), an exercise purpose, and a hobby purpose.

A user who sets an activity may be a participant of the activity, or may be an administrator. The administrator may participate in the activity.

For example, user account information for logging in to the linkage server 14 (hereinafter, referred to as "third account information") is determined for each user and is registered in the linkage server 14. The third account information is, for example, a user ID, a password, biological information of a user, or the like. When a user logs in to the linkage server 14, the user uses the terminal device 16 to transmit the third account information of the user to the linkage server 14, and requests login to the linkage server 14. The linkage server 14 authenticates the user who requested login by collating the third account information transmitted from the terminal device 16 by the user with the third account information registered in advance in the linkage server 14. When the third account information transmitted from the terminal device 16 by the user is registered in the linkage server 14, the linkage server 14 permits the user to log in to the linkage server 14. When the account information transmitted from the terminal device 16 by the user is not registered in the linkage server 14, the linkage server 14 does not permit the user to log in to the linkage server 14.

The processing of authenticating the user may be executed by a device (for example, an authentication server) other than the linkage server 14. In this case, the linkage server 14 receives a result of an authentication processing executed by the authentication server, and permits or does not permit the user to log in to the linkage server 14 in accordance with the result.

Account information common to the file management server 10, the messaging server 12, and the linkage server 14 may be used, and login to the file management server 10, the messaging server 12, and the linkage server 14 may be permitted using one piece of account information. Account information common to at least two of the file management server 10, the messaging server 12, and the linkage server 14 may be used.

The linkage server 14 may provide a user with a file management service or a messaging service. That is, the linkage server 14 may create a repository in the linkage server 14 and permit the user to use the repository. The linkage server 14 may permit plural users who logged in to the linkage server 14 to exchange messages with one another. When the linkage server 14 provides a file management service, the linkage server 14 may not link the file management service provided by the file management server 10 to an activity set for a specific purpose. It is needless to say that the linkage server 14 may provide a file management service and link the file management service provided by the file management server 10 to the activity set for a specific purpose. When the linkage server 14 provides a messaging service, the linkage server 14 may not link the messaging service provided by the messaging server 12 to an activity set for a specific purpose. It is needless to say that the linkage server 14 may provide a messaging service and link the messaging service provided by the messaging server 12 to the activity set for a specific purpose.

The terminal device 16 is, for example, a personal computer (hereinafter, referred to as a "PC"), a tablet PC, a smartphone, a mobile phone, or the like.

Figure 2:
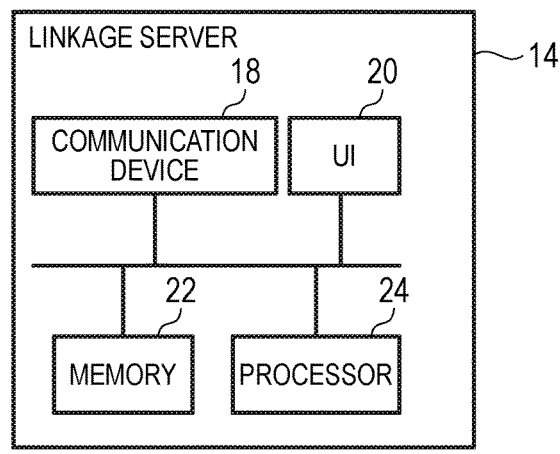
FIG. 2 is a block diagram showing a hardware configuration of a linkage server.

Hereinafter, a hardware configuration of the linkage server 14 will be described with reference to FIG. 2. FIG. 2 shows an example of a hardware configuration of the linkage server 14.

The linkage server 14 includes, for example, a communication device 18, a UI 20, a memory 22, and a processor 24.

The communication device 18 is a communication interface including a communication chip, a communication circuit, and the like, and has a function of transmitting information to another device and a function of receiving information from another device. The communication device 18 may have a wireless communication function or a wired communication function. The communication device 18 may communicate with another device by using, for example, short-range wireless communication, or may communicate with another device via the communication path N.

The UI 20 is a user interface and includes at least one of a display and an operation device. The display is a liquid crystal display, an EL display, or the like. The operation device is a keyboard, a mouse, an input key, an operation panel, or the like. The UI 20 may be a UI such as a touch panel including both a display and an operation device. The UI 20 may include a microphone and a speaker.

The memory 22 is a device constituting one or plural storage areas for storing data. The memory 22 is, for example, a hard disk drive (HDD), a solid state drive (SSD), various memories (for example, a RAM, a DRAM, and a ROM), other storage devices (for example, an optical disk), or a combination of an HDD, an SSD, various memories, and other storage devices. One or plural memories 22 are provided in the linkage server 14.

The processor 24 is configured to control an operation of each unit of the linkage server 14. The processor 24 may include a memory.

The processor 24 associates plural participants of each activity set by a user for each specific purpose with the activity. For each activity, the processor 24 manages the activity and participants of the activity in association with each other. For example, for each activity, the processor 24 associates activity identification information (for example, a name or ID of the activity) for identifying the activity with the third account information of the participants of the activity, and stores and manages the activity identification information and the third account information in the memory 22. The processor 24 may further associate the first account information and the second account information of the participants with the activity identification information. Account information common to the file management server 10, the messaging server 12, and the linkage server 14 may be associated with the activity identification information.

The processor 24 links one or plural services included in one or plural file management services and one or plural messaging services to each activity.

For example, the processor 24 links a repository of a file management service for which at least one participant has the first access right and that is provided by plural service providers to an activity. For each activity, the processor 24 manages the activity and one or plural repositories of a file management service linked to the activity in association with each other. For example, for each activity, the processor 24 associates activity identification information for identifying the activity with an address (for example, a URL or the like) for accessing each repository linked to the activity, and stores and manages the activity identification information and the address in the memory 22.

In response to a request for accessing an activity from each participant, the processor 24 causes a display of the terminal device 16 of a request source to display a file stored in a linked repository for which the participant of the request source has the first access right. The file is an example of a first file.

When a repository for which the participant of the request source has the first access right includes a repository of plural file management services (that is, when the participant of the request source has the first access right for the repository of the plural file management services), the processor 24 causes the display of the terminal device 16 of the participant of the request source to display a list of plural first files stored in the repository of the plural file management services.

For example, the processor 24 interprets the first access right of the participant of the request source set for a linked repository in the file management server 10. The processor 24 causes the display of the terminal device 16 of the participant of the request source to display the first files in a display mode in accordance with the first access right of the participant of the request source set in the linked repository. There are various methods for interpreting the first access right. For example, when the file management server 10 manages the third account information of the participant of the request source and the first account information of the participant of the request source in association with each other, the processor 24 inquires the file management server 10 about the content of the first access right of the participant of the request source who logged in to the linkage server 14 by using the third account information, thereby recognizing the content of the first access right of the participant of the request source. When the file management server 10 manages an activity and a participant by associating the first account information or common account information with the activity identification information for identifying the activity for which the participant requested access, the processor 24 may transmit the first account information or the common account information to the file management server 10 and inquire the file management server 10 about the content of the first access right of the participant of the request source, thereby recognizing the content of the first access right of the participant of the request source.

The processor 24 may change the first access right of each participant for a repository. In accordance with the change, the first access right of each participant in the file management server 10 may be changed. When the first access right is changed, the processor 24 may transmit information indicating that the first access right of the participant is changed to the terminal device 16 of the participant or an administrator who has the changed first access right. The processor 24 may change the first access right of the participant when the participant or the administrator permits the change, and may not change the first access right of the participant when the participant or the administrator does not permit the change. The first access right in the file management server 10 may not be changed, and only the first access right when the repository is used via the linkage server 14 may be changed.

The processor 24 may link a messaging service for which at least one participant has the second access right to an activity. For example, the processor 24 links a channel for which at least one participant has the second access right to the activity. For each activity, the processor 24 manages the activity and a channel of a messaging service linked to the activity in association with each other. For example, for each activity, the processor 24 associates activity identification information for identifying the activity with an address (for example, a URL or the like) for accessing the channel of the messaging service linked to the activity, and stores and manages the activity identification information and the address in the memory 22.

The processor 24 may cause the display of the terminal device 16 of the participant of the request source to display a list of files transmitted to the linked messaging service for which the participant of the request source has the second access right, together with the first files described above. The files are examples of a second file. For example, the processor 24 causes the display to display a list of the second files transmitted to a linked channel together with the first files described above.

The processor 24 may cause the display to display a list of the second files and the first files in the same display area so as to be able to identify that the second file is a file transmitted to the linked messaging service.

The processor 24 may cause the display of the terminal device 16 of the participant of the request source to display a list of messages transmitted to the linked messaging service for which the participant of the request source has the second access right, together with the first file described above.

For example, the processor 24 accesses the messaging server 12 that provides a channel of the linked messaging service, and interprets the second access right of the participant of the request source set in the channel of the messaging service. The processor 24 causes the display of the terminal device 16 of the participant of the request source to display the second file in a display mode in accordance with the second access right of the participant of the request source set for the channel of the linked messaging service. There are various methods for interpreting the second access right. For example, when the messaging server 12 manages the third account information of the participant of the request source and the second account information of the participant of the request source in association with each other, the processor 24 inquires the messaging server 12 about the content of the second access right of the participant of the request source who logged in to the linkage server 14 by using the third account information, thereby recognizing the content of the second access right of the participant of the request source. When the messaging server 12 manages an activity and a participant by associating the second account information or common account information with the activity identification information for identifying the activity for which the participant requested access, the processor 24 may transmit the second account information or the common account information to the file management server 10 and inquire the messaging server 12 about the content of the second access right of the participant of the request source, thereby recognizing the content of the second access right of the participant of the request source.

The processor 24 may change the second access right of each participant for a channel of a messaging service. In response to the change, the second access right of each participant in the messaging server 12 may be changed. When the second access right is changed, the processor 24 may transmit information indicating that the second access right of the participant is changed to the terminal device 16 of the participant or an administrator who has the changed second access right. The processor 24 may change the second access right of the participant when the participant or the administrator permits the change, and may not change the second access right of the participant when the participant or the administrator does not permit the change. The second access right in the messaging server 12 may not be changed, and only the second access right when the messaging service is used via the linkage server 14 may be changed.

Figure 3:
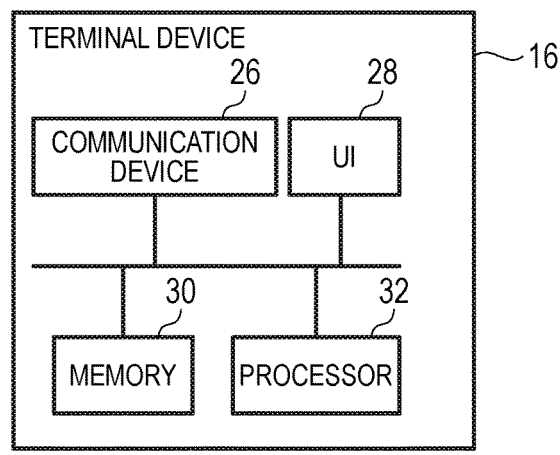
FIG. 3 is a block diagram showing a hardware configuration of a terminal device.

Hereinafter, a hardware configuration of the terminal device 16 will be described with reference to FIG. 3. FIG. 3 shows an example of a hardware configuration of the terminal device 16.

The terminal device 16 includes, for example, a communication device 26, a UI 28, a memory 30, and a processor 32.

The communication device 26 is a communication interface including a communication chip, a communication circuit, and the like, and has a function of transmitting information to another device and a function of receiving information transmitted from another device. The communication device 26 may have a wireless communication function or a wired communication function. The communication device 26 may communicate with another device by using, for example, short-range wireless communication, or may communicate with another device via the communication path N.

The UI 28 is a user interface and includes at least one of a display and an operation device. The display is a liquid crystal display, an EL display, or the like. The operation device is a keyboard, a mouse, an input key, an operation panel, or the like. The UI 28 may be a UI such as a touch panel including both a display and an operation device. The UI 28 may include a microphone and a speaker.

The memory 30 is a device constituting one or plural storage areas for storing data. The memory 30 is, for example, a hard disk drive (HDD), a solid state drive (SSD), various memories (for example, a RAM, a DRAM, and a ROM), other storage devices (for example, an optical disk), or a combination of an HDD, an SSD, various memories, and other storage devices. One or plural memories 30 are provided in the terminal device 16.

The processor 32 is configured to control an operation of each unit of the terminal device 16. The processor 32 may include a memory.

Figure 4:
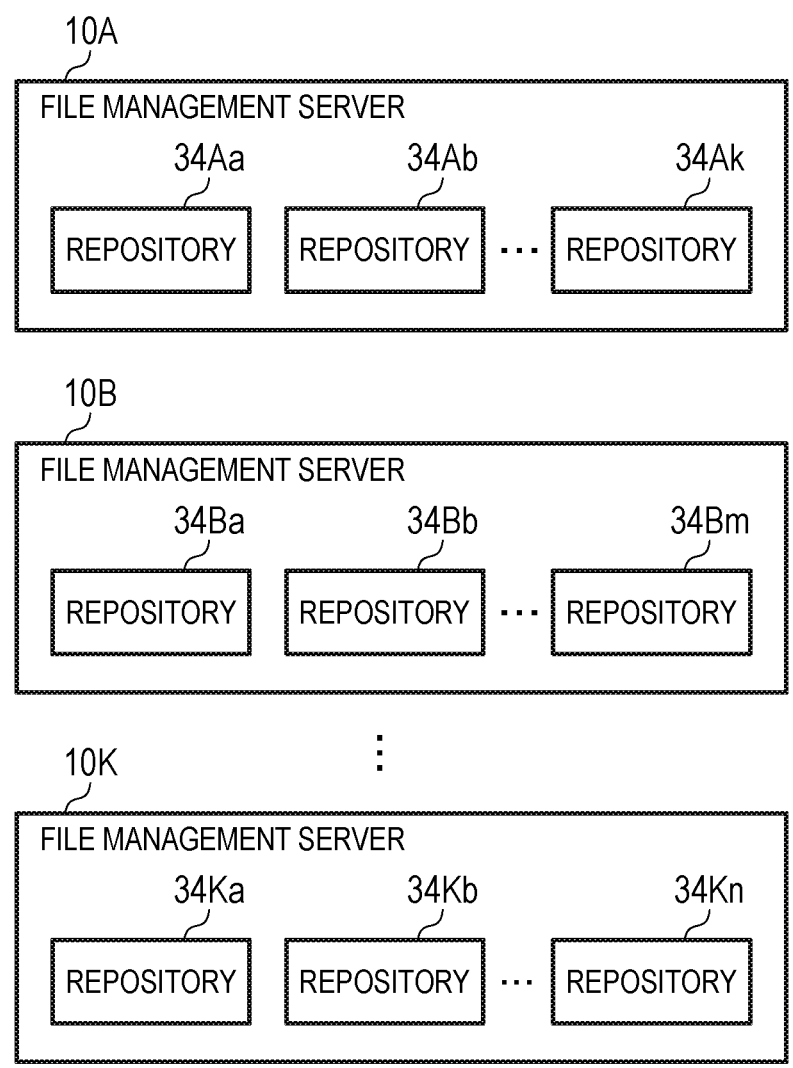
FIG. 4 is a block diagram showing a configuration of a file management server.

Hereinafter, a repository included in the file management server 10 will be described with reference to FIG. 4. FIG. 4 shows the repository included in each of the file management servers 10A, 10B, . . . 10K. Although not shown in FIG. 4, each file management server 10 includes, for example, a communication device, a UI, a memory, and a processor, and a file management service is provided by the processor.

The file management server 10A includes repositories 34Aa, 34Ab, . . . 34Ak. Each repository included in the file management server 10A is configured by a memory provided in the file management server 10A.

The file management server 10B includes repositories 34Ba, 34Bb, . . . 34Bm. Each repository included in the file management server 10B is configured by a memory provided in the file management server 10B.

The file management server 10K includes repositories 34Ka, 34Kb, . . . 34Kn. Each repository included in the file management server 10K is configured by a memory provided in the file management server 10K.

As described above, the first access right is set for each repository, and a user having the first access right is permitted to access the repository corresponding to the first access right and is permitted to use the repository. A repository for which the first access right is not set and access is permitted for all users or a repository for which the first access right is set such that access of all users is permitted may be configured in the file management server 10.

Hereinafter, the first exemplary embodiment will be described in detail. Hereinafter, for example, a first exemplary embodiment will be described on an assumption that a work project is launched as an activity and the project is performed. For example, an administrator who manages a project or a participant who participates in the project and performs work, operation, or the like is involved in the project. The administrator may participate in the project as a participant. The administrator or the participant uses the terminal device 16 of the administrator or the participant to use the file management service provided by the file management server 10 or the messaging service provided by the messaging server 12. The administrator or the participant uses the terminal device 16 of the administrator or the participant to use a service (for example, a file management service or a messaging service) linked to an activity by the linkage server 14.

Figure 5:
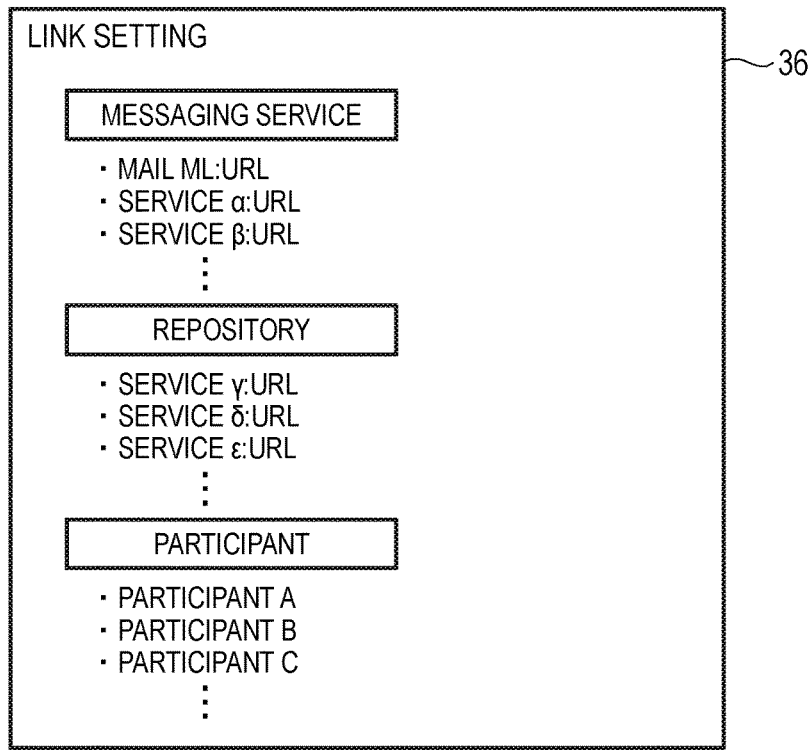
FIG. 5 is a diagram showing a setting screen.

The setting at the time of launching the project will be described with reference to FIG. 5. FIG. 5 shows a project setting screen 36. A participant of a project, a messaging service linked with the project, and a file management service linked with the project are set on the setting screen 36. For example, a project AAA is launched, and a participant of the project AAA and services (that is, the file management service and the messaging service) linked with the project AAA are set on the setting screen 36.

For example, an administrator of the project AAA uses the terminal device 16 of the administrator to log in to the linkage server 14, and requests the linkage server 14 to register the project AAA. When the processor 24 of the linkage server 14 receives the request, the processor 24 causes the display of the terminal device 16 of the administrator to display the setting screen 36. The administrator performs each setting on the setting screen 36.

The administrator inputs information for identifying each participant of the project AAA on the setting screen 36, and registers each participant in the project AAA. For example, the administrator inputs the third account information of each participant on the setting screen 36. The processor 24 of the linkage server 14 receives the input third account information of each participant, and associates the third account information of each participant with activity identification information for identifying the project AAA. Accordingly, each participant is registered in the project AAA. In the example shown in FIG. 5, the third account information of each of participants A, B, C, . . . is input, and the participants A, B, C, . . . are registered in the project AAA. In this manner, plural participants are associated with the project AAA that is an example of an activity.

The administrator sets each channel of the messaging service linked to the project AAA and a link to each channel on the setting screen 36. For example, the administrator inputs an address (for example, URL) for accessing a channel of the messaging service linked to the project AAA. The processor 24 of the linkage server 14 receives the input address and associates the input address with the activity identification information of the project AAA. Accordingly, the messaging service is linked to the project AAA. More specifically, the channel of the messaging service is linked to the project AAA. In the example shown in FIG. 5, an address (for example, a URL) of a channel ML that is a mailing list of an e-mail, an address (for example, a URL) for accessing a channel α1 (for example, a group chat) provided by a messaging service α, and an address (for example, a URL) for accessing a channel β1 (for example, a group chat) provided by a messaging service β are input on the setting screen 36. The address of the channel ML, the address of the channel α1, and the address of the channel β1 are associated with the project AAA. Accordingly, the channel ML, the channel α1, and the channel β1 are linked to the project AAA.

Each of the e-mail, the messaging service α, and the messaging service β is provided by any one of the messaging servers 12A, 12B, . . . 12L. One or plural services among the e-mail, the messaging service α, and the messaging service β may be provided by the same messaging server 12, or one or plural services may be provided by different messaging servers 12.

The administrator sets each repository of the file management service linked to the project AAA and a link to each repository on the setting screen 36. For example, the administrator inputs an address (for example, URL) for accessing a repository of the file management service linked to the project AAA. The processor 24 of the linkage server 14 receives the input address and associates the input address with the activity identification information of the project AAA. Accordingly, the file management service is linked to the project AAA. More specifically, the repository of the file management service is linked to the project AAA. In the example shown in FIG. 5, an address (for example, URL) for accessing a repository γ1 provided by a file management service γ, an address (for example, URL) for accessing a repository δ1 provided by a file management service δ, and an address (for example, URL) for accessing a repository ε1 provided by a file management service ε are input on the setting screen 36. The address of the repository γ1, the address of the repository δ1, and the address of the repository ε1 are associated with the project AAA. Accordingly, the repositories γ1, δ1, ε1 are linked to the project AAA.

Each of the file management services γ, δ, and ε is provided by any one of the file management servers 10A, 10B, . . . 10K. One or plural the file management services γ, δ, and ε may be provided by the same file management server 10, or one or plural the file management services γ, δ, and ε may be provided by different file management servers 10.

The administrator of the project AAA may not set a link, and a person having permission to set the first access right to each repository in the file management server 10 may set a link to each repository, and a person having permission to set the first access right to each channel in the messaging server 12 may set a link to each channel.

The participants (for example, the participants A, B, C, . . . ) registered on the setting screen 36 may or may not have an access right to each repository linked to the project AAA or each channel linked to the project AAA.

For example, the participant A may have the second access right to the channel α1, and the participant B may not have the second access right to the channel α1. It is conceivable that the participant A is registered, as a user having the second access right to the channel α1, in the messaging server 12 that provides the messaging service α and the participant B is not registered, as a user having the second access right to the channel α1, in the messaging server 12 that provides the messaging service α.

The participant A may have the first access right to the repository γ1, and the participant B may not have the first access right to the repository γ1. It is conceivable that the participant A is registered, as a user having the first access right to the repository γ1, in the file management server 10 that provides the file management service γ and the participant B is not registered, as a user having the first access right to the repository γ1, in the file management server 10 that provides the file management service γ.

As described above, each participant is registered in the project AAA, and each repository and each channel are linked to the project AAA. The processor 24 associates the activity identification information of the project AAA, information (for example, third account information) for identifying each participant of the project AAA, the address of each repository linked to the project AAA, and the address of each channel linked to the project AAA, and stores and manages these pieces of information in the memory 22. The same applies to a case where a project other than the project AAA is launched. In this manner, for each project, the processor 24 manages the project, each participant of the project, each repository linked to the project, and each channel linked to the project in association with each other.

Although plural channels and plural repositories are linked to the project AAA in the example shown in FIG. 5, this is merely an example. The number of channels linked to the project AAA may be one, and the number of repositories linked to the project AAA may be one. Further, one or plural repositories may be linked to the project AAA, and a channel may not be linked to the project AAA. Similarly, one or plural channels may be linked to the project AAA, and a repository may not be linked to the project AAA.

Hereinafter, a processing in a case where a participant requests access to an activity will be described. For example, the participant A of the project AAA requests access to the project AAA using the terminal device 16A of the participant A.

For example, the participant A uses the terminal device 16A of the participant A to transmit the third account information of the participant A to the linkage server 14 and request login to the linkage server 14 and access to the project AAA. Since the third account information of the participant A is registered in the linkage server 14, the processor 24 of the linkage server 14 permits the participant A to log in to the linkage server 14. As described above, since the participant A is associated with the project AAA, the processor 24 permits the participant A to access the project AAA. In this case, the processor 24 causes the display of the terminal device 16A of the participant A to display the first file stored in a repository for which the participant A of the request source has the first access right and that is linked to the project AAA. The processor 24 causes the display of the terminal device 16A of the participant A to display a message transmitted to a channel of a messaging service for which the participant A has the second access right and that is linked to the project AAA, together with the first file.

Figure 6:
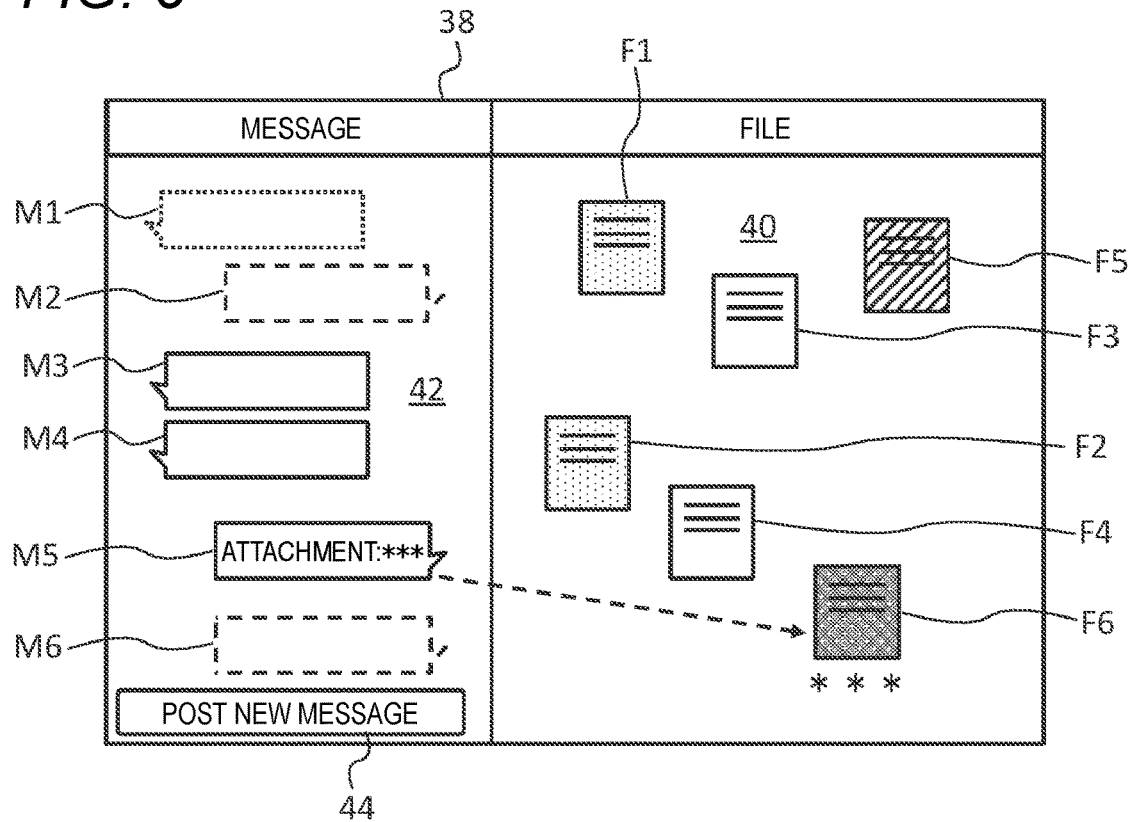
FIG. 6 is a diagram showing a screen.

FIG. 6 shows an example of such displays. FIG. 6 shows a screen 38. The screen 38 is a screen displayed on the display of the terminal device 16A of the participant A. The screen 38 includes display areas 40 and 42. The processor 24 configures the display areas 40 and 42 on the display.

The display area 40 is an area in which a file is displayed. For example, the processor 24 displays, in the display area 40, a list of files stored in a repository for which the participant A has the first access right and that is linked to the project AAA. For example, each file is displayed in accordance with a timeline notation. That is, the files are displayed side by side in chronological order according to date and time when the files are created, date and time when the files are stored in the repository, or date and time when the files are updated. For example, according to the date and time, the files are displayed side by side from top to bottom, from bottom to top, from left to right, or from right to left. It is needless to say that the files may be displayed without being arranged in chronological order. For example, the file may be displayed at a position designated by a participant, a position according to a file name, or the like.

In the example shown in FIG. 6, plural files stored in different repositories are displayed in a mixed manner in the display area 40. Only a file stored in a specific repository may be displayed by a filter function, a file may be displayed for each first access right, or a file may be displayed for each repository.

The processor 24 may display a file that does not fit in the display area 40 in the display area 40 by moving the display area 40 in an upper-lower direction or in a left-right direction (for example, by scrolling the display area 40).

The display area 42 is an area in which a message is displayed. For example, the processor 24 displays, in the display area 42, a list of messages transmitted to a channel for which the participant A has the second access right and that is linked to the project AAA. For example, each message is displayed in accordance with a timeline notation. That is, the messages are displayed side by side in accordance with date and time when the message is transmitted to the channel. Even when channels to which the messages are transmitted are different from one another, the messages are displayed side by side in accordance with date and time when the messages are transmitted to the channels. For example, according to the date and time, the messages are displayed side by side from top to bottom and from bottom to top. Information (for example, a name, a nickname, an ID, an image such as an icon, or the like) for identifying a participant who transmitted the message is displayed in the display area 42 in association with the message. For example, the information is displayed near the message.

In the example shown in FIG. 6, plural messages transmitted to different channels are displayed in a mixed manner in the display area 42. Only a message transmitted to a specific channel by a filter function may be displayed, a message may be displayed for each second access right, or a message may be displayed for each channel. When a voice call such as a telephone call is used as a messaging service and voice is exchanged among participants, the voice may be converted into a character string and the character string may be displayed in the display area 42 as a message.

In addition, when a file is operated by a participant in the display area 40 (for example, when a file is edited, when a file is moved, or the like), or when an operation of uploading a file to the display area 40 is performed, the processor 24 may display, in the display area 42, a message indicating that an operation is performed.

The processor 24 may display a message that does not fit in the display area 42 in the display area 42 by moving the display area 42 in the upper-lower direction or the left-right direction (for example, scroll the display area 42).

When a participant (for example, the participants B and C) other than the participant A accesses the project AAA, a screen similar to the screen 38 is displayed on the display of the terminal device 16 of the participant. For example, the display of the terminal device 16B of the participant B displays a file stored in a repository for which the participant B has the first access right and that is linked to the project AAA, and a message transmitted to a channel for which the participant B has the second access right and that is linked to the project AAA. The same applies to the participant C.

The linkage server 14 may provide a messaging service. In this case, an input field 44 for transmitting a message to the messaging service is displayed on the screen 38. When a message is input in the input field 44 and a transmission instruction is given, the processor 24 displays the input message in the display area 42. The processor 24 transmits the input message to another participant who accesses the project AAA. When a message transmitted to a channel linked to the project AAA is replied using a messaging service provided by the linkage server 14, the replied message may be reflected in a channel of a reply destination.

Each file and each message shown in FIG. 6 will be described in detail.

The files F1 and F2 are files stored in the repository γ1 of the file management service γ linked to the project AAA. The files F3 and F4 are files stored in the repository δ1 of the file management service δ linked to the project AAA. The file F5 is a file stored in the repository ε1 of the file management service ε linked to the project AAA. The file F6 is a file attached to a message M5.

The participant A has the first access right to the repositories γ1 and δ1, and does not have the first access right to the repository ε1. That is, the participant A has the first access right to the files F1 to F4, and does not have the first access right to the file F5. In this case, the processor 24 displays a list of the files F1 to F4 in the display area 40, and does not display the file F5. Although the file F5 is shown in FIG. 6 for convenience of description, the file F5 is not displayed on the screen 38. The file F6 is a file attached to the message M5 and is displayed in the display area 40. For example, an image (for example, an icon) representing each of the files F1 to F4 and F6 is displayed. An attachment of a file will be described in detail later.

The processor 24 may change a display mode of the files according to a repository in which the files are stored. For example, the processor 24 changes a display color, a size, a shape, a pattern, and the like of the files according to the repository in which the files are stored. In the example shown in FIG. 6, the files F1 and F2 are displayed in a color (for example, light blue) corresponding to the file management service γ, the files F3 and F4 are displayed in a color (for example, green) corresponding to the file management service δ, and the file F6 is displayed in a color (for example, orange) corresponding to the attachment of the message.

A message M1 is a message transmitted to a user registered in the channel ML (that is, a mailing list ML) linked to the project AAA. The messages M2 and M6 are messages transmitted to the channel α1 of the messaging service α linked to the project AAA. The messages M3, M4, and M5 are messages transmitted to the channel β1 of the messaging service β linked to the project AAA. The file F6 is attached to the message M5.

The participant A has the second access right to the channel ML that is a mailing list and the channel β1 of the messaging service β, and does not have the second access right to the channel α1 of the messaging service α. That is, the participant A has the second access right to the messages M1, M3, M4, and M5, and does not have the second access right to the messages M2 and M6. In this case, the processor 24 displays a list of the messages M1, M3, M4, and M5 in the display area 42, and does not display the messages M2 and M6. Although the messages M2 and M6 are shown in FIG. 6 for convenience of description, the messages M2 and M6 are not displayed on the screen 38.

The processor 24 may change a display mode of the messages in accordance with a channel to which the messages are transmitted. For example, the processor 24 changes a display color, a size, a shape, a pattern, or the like of the entire message or a frame, and a display color, a size, a font type, or the like of each character included in the message, in accordance with the channel to which the messages are transmitted. In the example shown in FIG. 6, a frame and characters of the message M1 are displayed in a color (for example, purple) corresponding to the mailing list M, and a frame and characters of the mailing lists M3, M4, and M5 are displayed in a color (for example, red) corresponding to the messaging service β.

As shown in FIG. 6, in response to a request for accessing the project AAA from the participant A, the processor 24 displays, in the display area 40, a list of files (for example, the files F1 to F4) stored in a repository (for example, the repositories γ1 and 61) for which the participant A has the first access right. For example, the processor 24 displays the files F1 to F4 together in the display area 40. The files F1 to F4 are examples of the first file.

When the participant A has the first access right to repositories of plural file management services, the processor 24 displays, in the display area 40, a list of plural files stored in the repositories of the plural file management services. In the example shown in FIG. 6, the participant A has the first access right to the repository γ1 of the file management service γ and the repository δ1 of the file management service δ, and the processor 24 displays, in the display area 40, a list of files (for example, the files F1 to F4) stored in the repositories γ1 and δ1.

The processor 24 may display, in the display area 40, a list of files transmitted to the messaging service for which the participant A has the second access right together with the first file (that is, the files stored in the repository of the file management service). In the example shown in FIG. 6, the message M5 to which the file F6 is attached is transmitted to the channel β1 for which the participant A has the second access right. In this case, the processor 24 displays the message M5 in the display area 42 and displays the file F6 together with the first file in the display area 40. The file F6 is an example of the second file.

The processor 24 displays the file F6 in the display area 40 so that the file F6 attached to the message M5 can be identified as a file transmitted to the messaging service. As described above, for example, the file F6 is displayed in a color (for example, orange) corresponding to the attachment of the message. This color may be a color corresponding to the messaging service.

When the file F6 is designated by the participant A, the processor 24 may display the message M5 to which the designated file F6 is attached so as to indicate the message M5. For example, the processor 24 displays the message M5 in a conspicuous manner so that the message M5 can be distinguished from other messages. Specifically, the processor 24 may decorate the message M5, may enlarge and display the message M5, or may display the message M5 in a specific color.

When the messaging service is not linked to the project AAA, a message exchanged via each messaging service is not displayed on the screen 38. Similarly, when the file management service is not linked to the project AAA, a file stored in a repository of each file management service is not displayed on the screen 38.

When a file stored in a repository linked to the project AAA is deleted, the deleted file is not displayed in the display area 40. When the first access right to a file is changed in the file management service, the file is displayed in the display area 40 or the file is not displayed in the display area 40 in accordance with the changed first access right. In a case where a file stored in a repository linked to the project AAA is copied, transmitted to the linkage server 14, and stored in the linkage server 14, even when the file stored in the repository is deleted, the file is displayed in the display area 40 as long as the copied file is stored in the linkage server 14. Whether or not to copy a file is set in advance by an administrator or the like.

Similarly, when a message transmitted to a channel linked to the project AAA is deleted, the deleted message is not displayed in the display area 42. When the second access right to a channel is changed in the messaging service, the message is displayed in the display area 42 or the message is not displayed in the display area 42 in accordance with the changed second access right. In a case where a message transmitted to a channel linked to the project AAA is copied, transmitted to the linkage server 14, and stored in the linkage server 14, even when the message is deleted in the channel, the message is displayed in the display area 42 as long as the copied message is stored in the linkage server 14. Whether or not to copy a message is set in advance by an administrator or the like.

Hereinafter, a processing in a case where a participant requests access to an activity will be described in more detail.

For example, the participant A has the first access right to the repositories γ1, δ1, and ε1 and has the second access right to the channels ML, α1, and β1. Therefore, the participant A is permitted to access all repositories and all channels linked to the project AAA. For example, a participant having certain permission or more, such as a supervisor, a responsible party, a leader, or a manager of the project AAA, is an example of the participant A.

The participant B has the first access right to the repositories δ1 and ε1 and has the second access right to the channels ML and α1. The participant B does not have the first access right to the repository γ1 and does not have the second access right to the channel β1. Therefore, the participant B is permitted to access the repositories δ1 and ε1 and the channels L and α1, but is not permitted to access the repository γ1 and the channel β1. For example, a participant (for example, a general participant who does not have certain permission or more as described above) other than a participant who has certain permission or more described above is an example of the participant B.

For example, the repository γ1 is a repository dedicated to a participant (for example, the participant A) who has certain permission or more, and the channel β1 is a channel dedicated to a participant who has certain permission or more. The repositories δ1 and ε1 are a repository for which all participants of the project AAA are permitted to access, and the channels ML and al are a channel for which all participants of the project AAA are permitted to access. That is, all participants including the participant (for example, the participant A) who has certain permission or more and the participant (for example, the participant B) who does not have certain permission or more are permitted to access the repositories δ1 and ε1 and the channels ML and al.

Figure 7:
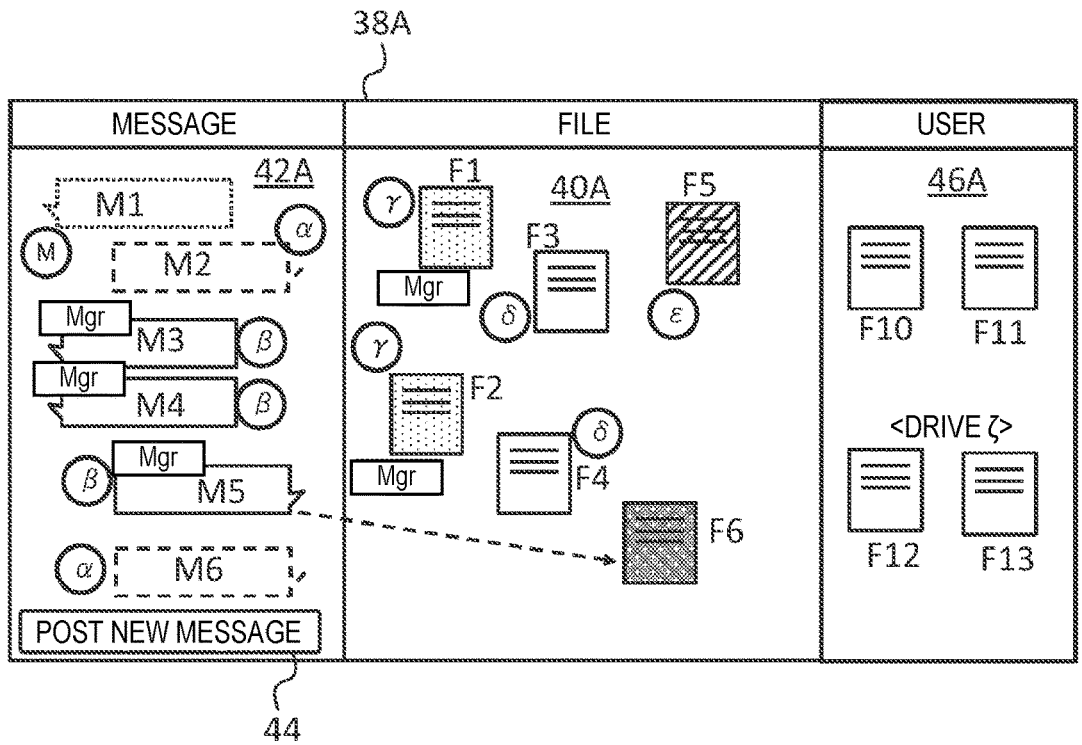
FIG. 7 is a diagram showing a screen.

FIG. 7 shows a screen 38A displayed when the participant A requests access to the project AAA. The screen 38A includes display areas 40A, 42A, and 46A.

The processor 24 displays a list of files stored in a repository linked to the project AAA in the display area 40A.

The files displayed in the display area 40A are the same as the files displayed in the display area 40 shown in FIG. 6.

The processor 24 displays a list of messages transmitted to a channel linked to the project AAA in the display area 42A. The messages displayed in the display area 42A are the same as the messages displayed in the display area 42 shown in FIG. 6.

The processor 24 displays, in the display area 46A, a list of files stored in a repository for which the participant A has an access right and stored in a repository different from the repository linked to the project AAA. The files displayed in the display area 46A are examples of a third file. For example, a file stored in an individual repository of the participant A is stored in the display area 46A. As shown in FIG. 7, the processor 24 displays a list of files (that is, the first file) stored in the repository linked to the project AAA and a list of files (that is, a third file) stored in the repository that is a repository for which the participant A has an access right and that is different from the repository linked to the project AAA, on a display in a distinguishable manner.

Figure 8:
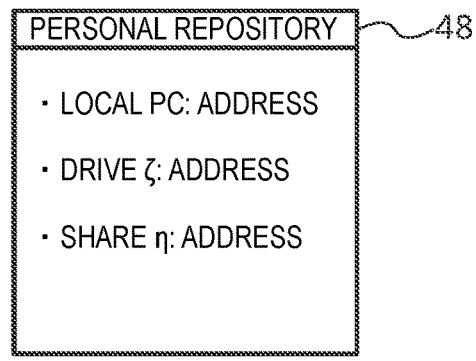
FIG. 8 is a diagram showing a setting screen.

For example, the participant A set an address of a repository in which the files displayed in the display area 46A are stored. FIG. 8 shows a screen 48 used for such setting. The screen 48 is displayed on a display of the terminal device 16A of the participant A. In the example shown in FIG. 8, the participant A inputs addresses of a local PC, a drive ζ, and a share η. The local PC, the drive ζ, and the sharer η are examples of a repository. The local PC is the terminal device 16A used by the participant A, and an address of a storage area (for example, a folder) configured in the memory 22 of the terminal device 16 is input as an address of the local PC. The drive ζ and the sharer η are repositories for which the participant A has the first access right.

Files stored in each repository set on the screen 48 are displayed in the display area 46A. In the example shown in FIG. 7, files F10, F11, F12, F13, . . . are displayed in the display area 46A. For example, the files F10 and F11 are files stored in the local PC (that is, the terminal device 16A), and the files F12 and F13 are files stored in the drive ζ. When the files stored in the share η are not displayed in the display area 46A, the files stored in the share η are displayed in the display area 46A by scrolling the display area 46A in the upper-lower direction or the left-right direction.

The processor 24 may switch between display and non-display of the display area 46A in accordance with a display switch instruction of the participant A.

The processor 24 may display information for identifying a file management service in which a file is stored in association with the file. The information for identifying the file management service is, for example, a character string, an image, a figure, or the like indicating the file management service. For example, a badge (for example, an image representing γ) indicating the file management service γ is attached to the files F1 and F2 stored in the repository γ1 and is displayed. A badge (for example, an image representing δ) indicating the file management service δ is attached to the files F3 and F4 stored in the repository δ1 and is displayed. A badge (for example, an image representing ε) indicating the file management service ε is attached to the file F5 stored in the repository ε1 and is displayed. In this manner, information indicating which file management service a file is derived from is displayed.

For example, as shown in FIG. 7, when plural files stored in different repository are displayed in a mixed manner in the display area 40A, the processor 24 attaches information such as a badge indicating which file management service a file is derived from to each file and displays the attached information. When the participant A gives an instruction to display information such as a badge, the processor 24 may display the information such as the badge.

The processor 24 may display, in association with the files F1 and F2, information indicating that the files F1 and F2 are files for which only a participant having certain permission or more is permitted to access. The information is, for example, a character string, an image, a figure, or the like. In the example shown in FIG. 7, a badge "Mgr" (for example, an image representing "Mgr") is an image indicating that only a participant having certain permission or more is permitted to access, and the badge "Mgr" is attached to the files F1 and F2 and is displayed.

The processor 24 may display, in association with a message, information for identifying a messaging service of a channel to which the message is transmitted. The information for identifying the messaging service is, for example, a character string, an image, a figure, or the like indicating the messaging service. For example, a badge (for example, an image representing M) indicating a mailing list is attached to the message M1 transmitted to the channel ML and is displayed. A badge (for example, an image representing α) indicating the messaging service α is attached to the messages M2 and M6 transmitted to the channel α1 and is displayed. A badge (for example, an image representing β) indicating the messaging service β is attached to the messages M3, M4, and M5 transmitted to the channel β1 and is displayed. In this manner, information indicating which messaging service a message is derived from is displayed.

For example, as shown in FIG. 7, when plural messages transmitted to different channels are displayed in a mixed manner in the display area 42A, the processor 24 attaches information such as a badge indicating which messaging service a message is derived from to each message and displays the attached information. When the participant A gives an instruction to display information such as a badge, the processor 24 may display the information such as the badge.

The processor 24 may display, in association with the messages M3, M4, and M5, information indicating that the messages M3, M4, and M5 are messages for which only a participant having certain permission or more is permitted to access. The information is, for example, a character string, an image, a figure, or the like. In the example shown in FIG. 7, the badge "Mgr" is an image indicating that only a participant having certain permission or more are permitted to access, and the badge "Mgr" is attached to the messages M3, M4, and M5 and is displayed.

(Switching of Display)

Hereinafter, switching of display between a file and a message will be described. For example, the file and the message are switched by a filter function based on permission of a participant.

Figure 9:
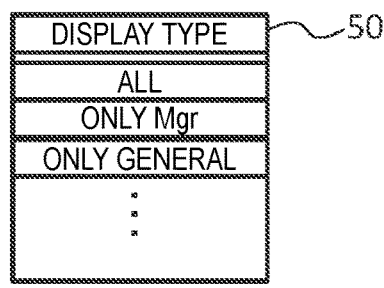
FIG. 9 is a diagram showing a setting screen.

FIG. 9 shows a screen 50 for setting a filter function for a file. When the participant A gives an instruction to display the screen 50 using the terminal device 16A, the processor 24 causes the display of the terminal device 16A to display the screen 50. Types of the filter function include "all", "only Mgr", "only general", and the like. The filter function "all" is a function of displaying all files stored in a repository linked to the project AAA. The filter function "only Mgr" is a function of displaying a file stored in a repository that is linked to the project AAA and for which only a participant having certain permission or more is permitted to access. The filter function "only general" is a function of displaying a file stored in a repository that is linked to the project AAA and for which a participant who does not have certain permission or more is permitted to access. When the participant A sets the filter function on the screen 50, the processor 24 displays a file according to the setting.

Figure 10:
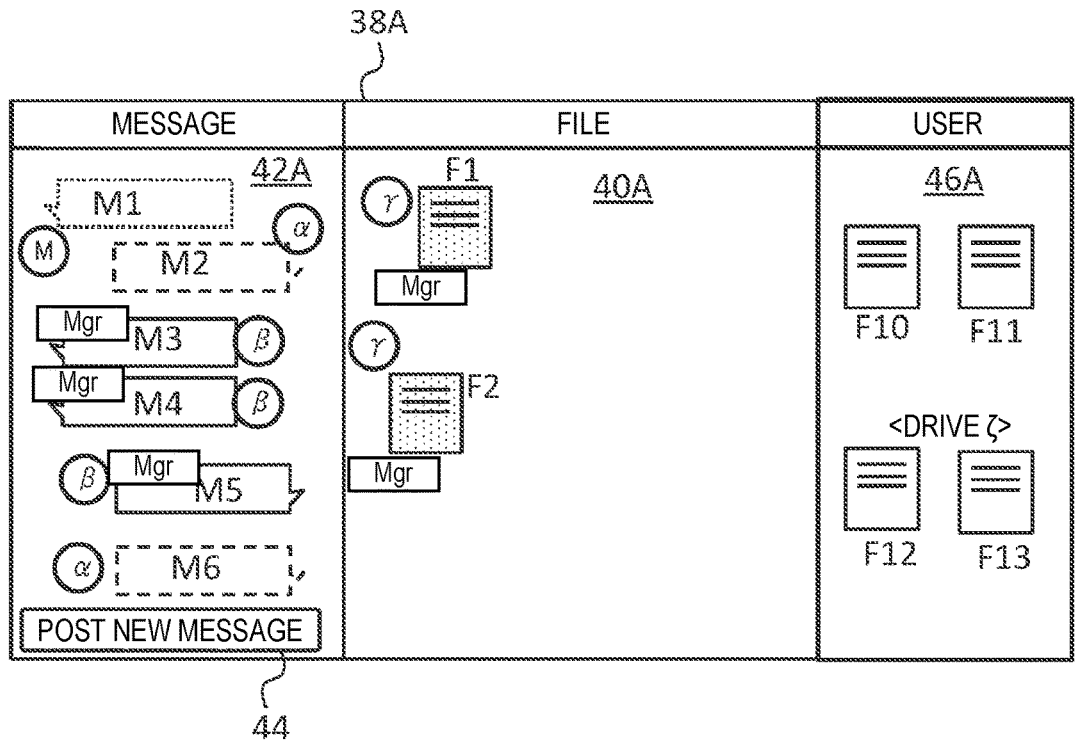
FIG. 10 is a diagram showing a screen.

FIG. 10 shows the screen 38A after the filter function for a file is executed. Here, the filter function "only Mgr" is set as an example. In this case, the processor 24 displays, in the display area 40A, only a file (for example, the files F1 and F2) stored in a repository (for example, the repository γ1) that is linked to the project AAA and for which only a participant having certain permission or more is permitted to access. When the filter function is executed, information such as a badge indicating the file management service γ may be attached to the files F1 and F2 and may be displayed or not displayed.

The processor 24 may store a file attached to a message (for example, the file F6 attached to the message M5) in a specific repository. The specific repository may be designated by, for example, a participant or may be determined in advance. When a file attached to a message is stored in a specific repository, the processor 24 may switch display of the file in accordance with the first access right set for the specific repository.

Figure 11:
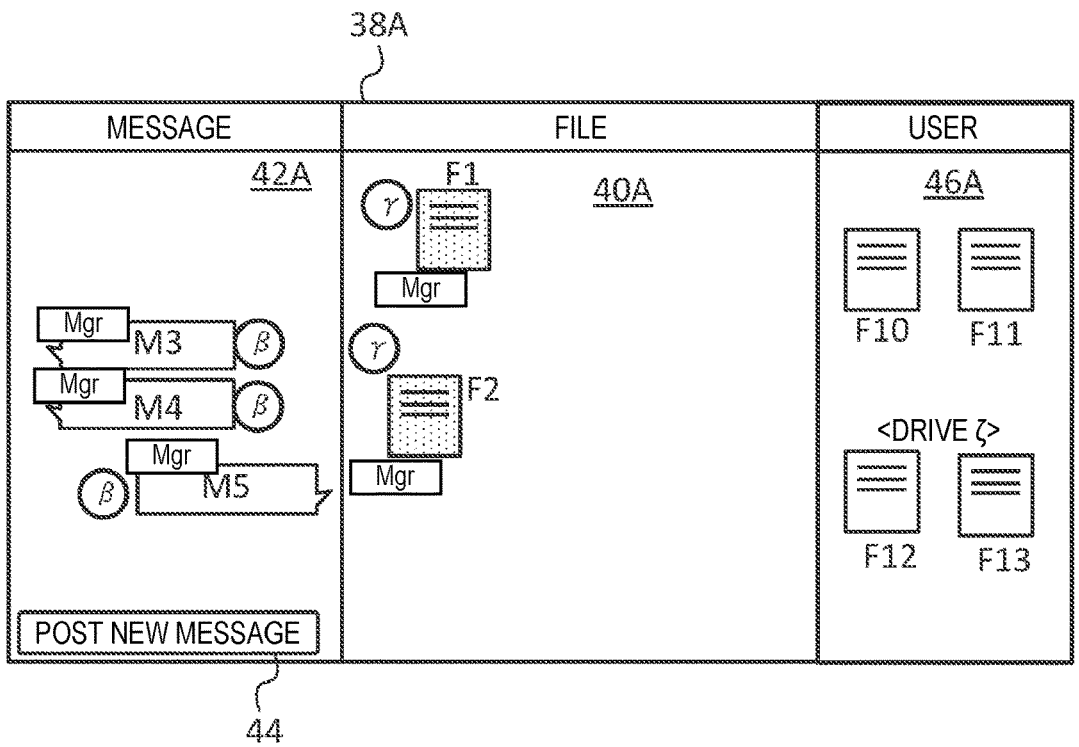
FIG. 11 is a diagram showing a screen.

Similar to the file, display of a message may be switched by the filter function. For example, the filter function for a message is set on a screen similar to the screen 50. FIG. 11 shows the screen 38A after the filter function for a message is executed. Here, the filter function "only Mgr" is set as an example. In this case, the processor 24 displays, in the display area 42A, only a message (for example, the messages M2 and M6) transmitted to a channel (for example, the channel α1) that is linked to the project AAA and for which only a participant having certain permission or more is permitted to access. When the filter function is executed, information such as a badge indicating the messaging service α may be attached to the messages M2 and M6 and may be displayed or not displayed.

The filter function may be executed only for a file, the filter function may be executed only for a message, or the filter function may be executed for both a file and a message. Although the filter function is also executed for a file in the example shown in FIG. 11, the filter function may not be executed for a file. Different filter functions may be executed for a file and a message. For example, the filter function "only Mgr" may be executed for a file, and the filter function "all" may be executed for a message.

The processor 24 may associate information such as a badge indicating permission of a participant with information (for example, an image such as an icon, and a character string such as a name, a nickname, or an ID) for identifying a participant who transmitted a message, and may display the information such as a badge in the display area 42. For example, the processor 24 displays information such as a badge indicating permission of a participant near an image such as an icon representing the participant. In another example, the processor 24 may display a list of participants in a specific area (for example, an upper area or a lower area) in the display area 42, or may display, in a specific area, an image such as a button for transitioning to a screen displaying the list of participants. The processor 24 may display information such as a badge indicating permission of each participant in the list of participants.

Figure 12:
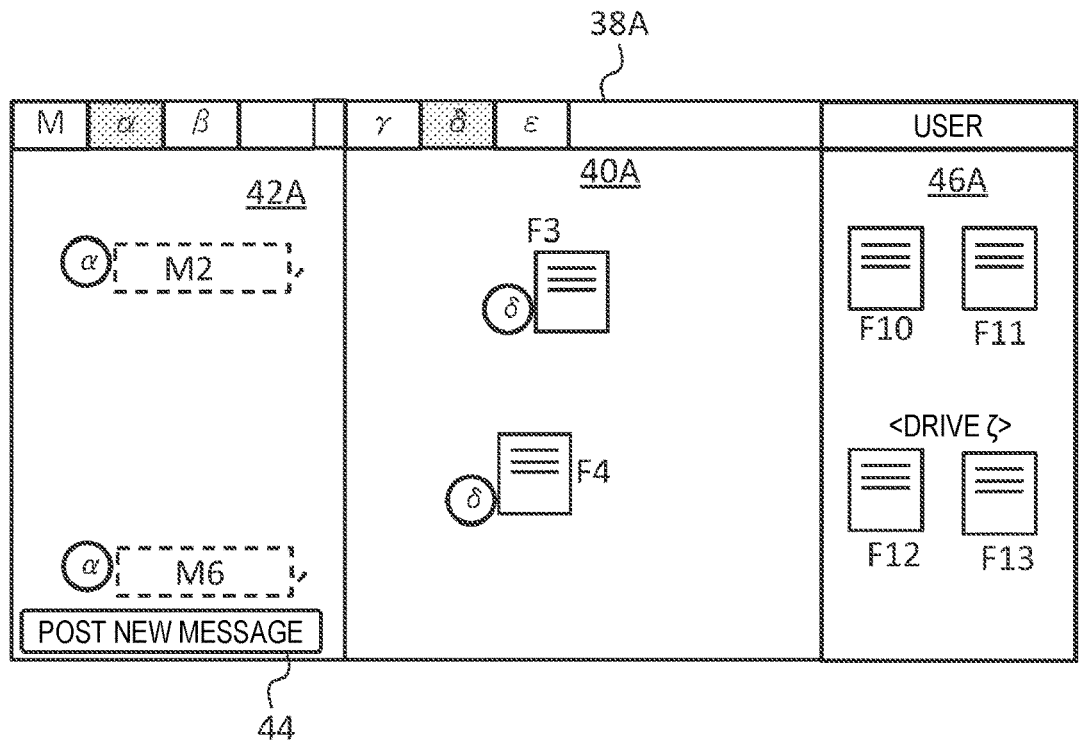
FIG. 12 is a diagram showing a screen.

The display of a file and a message may be switched by a tab. FIG. 12 shows an example of such switching.

In the example shown in FIG. 12, a tab of the file management service δ is selected, and only the files F3 and F4 stored in the repository δ1 are displayed in the display area 40A. When a tab of the file management service γ is selected, only the files F1 and F2 stored in the repository γ1 are displayed in the display area 40A. When a tab of the file management service ε is selected, only the file F5 stored in the repository ε1 is displayed in the display area 40A.

In the example shown in FIG. 12, a tab of the messaging service α is selected, and only the messages M2 and M6 transmitted to the channel α1 are displayed in the display area 42A. When a tab of the mailing list ML is selected, only the message M1 transmitted to the channel ML is displayed in the display area 42A. When a tab of the messaging service β is selected, only the messages M3, M4, and M5 transmitted to the channel β1 are displayed in the display area 42A.

Figure 13:
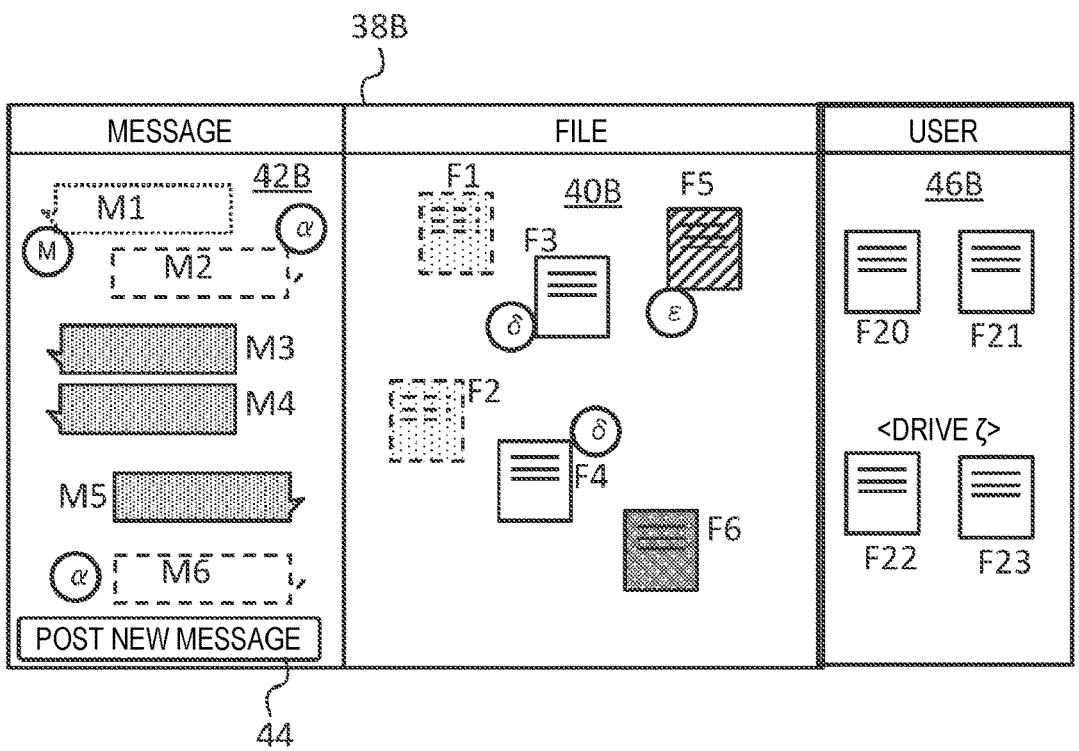
FIG. 13 is a diagram showing a screen.

FIG. 13 shows a screen 38B displayed when the participant B requests access to the project AAA. The screen 38B includes display areas 40B, 42B, and 46B.

The processor 24 displays a list of files stored in a repository linked to the project AAA in the display area 40A. Unlike the participant A, the participant B is not a participant having certain permission or more, and is a general participant. Therefore, the processor 24 displays, in the display area 40B, a list of files (for example, the files F3, F4, and F5) stored in a repository that is linked to the project AAA and for which a participant who does not have certain permission or more is permitted to access. The processor 24 does not display, in the display area 40B, the files (for example, the files F1 and F2) stored in a repository that is linked to the project AAA and for which only a participant having certain permission or more is permitted to access. Although the files F1 and F2 are indicated by broken lines for the convenience of description in FIG. 13, the files F1 and F2 are not displayed in the display area 40B. The files F1 and F2 are examples of a fourth file.

Since the file F6 is a file attached to a message, the file F6 may be displayed in the display area 40B. As will be described later, since the message M5 is a message for which only a participant having certain permission or more is permitted to access, the file F6 attached to the message M5 may be a file for which only a participant having certain permission or more is permitted to access. In this case, the file F6 is not displayed in the display area 40B.

The processor 24 may display information indicating the presence of the fourth file (for example, the files F1 and F2) in the display area 40B.

For example, when files are displayed side by side in the display area 40B in accordance with a timeline notation, the processor 24 does not display the files F1 and F2 in the display area 40B, ensures spaces at positions where the files F1 and F2 are to be displayed in accordance with a display condition, and does not display other files in the spaces. In the example shown in FIG. 13, other files are not displayed at the positions where the files F1 and F2 are to be displayed.

In another example, the processor 24 displays the files F1 and F2, but may not receive an operation of the participant B on the files F1 and F2. For example, even when the participant B performs an operation of opening the files F1, and F2 by clicking or the like, an operation of deleting the files F1 and F2, an operation of moving the files F1 and F2, or the like, the processor 24 does not receive such operations and does not open, delete, or move the files F1 and F2. When the files F1 and F2 are displayed, the processor 24 may display the files F1 and F2 and other files in a distinguishable manner. For example, the processor 24 displays images representing the files F1 and F2 smaller than images of other files, displays images representing the files F1 and F2 in a color different from a color of images representing other files, or lightly displays the images representing the files F1 and F2. The processor 24 may display the files F1 and F2 in a manner in which the files F1 and F2 are inconspicuous compared with other files.

In response to a request from the participant B, the processor 24 may grant an access right to the fourth file (for example, the files F1 and F2) to the participant B, or may request a person having permission to grant an access right, such as an administrator of the project AAA, to grant the access right to the participant B. When the person having permission to grant an access right permits to grant the access right to the participant B, the processor 24 grants the access right to the participant B. When the person having permission to grant an access right does not permit to grant the access right to the participant B, the processor 24 does not grant the access right to the participant B. When the access right is granted to the participant B, the processor 24 displays the files F1 and F2 in the display area 40B, receives an operation of the participant B on the files F1 and F2, and performs a processing (for example, a processing of opening a file, a processing of deleting a file, a processing of moving a file, or the like) according to the operation.

The processor 24 displays a list of the messages transmitted to a channel linked to the project AAA in the display area 42B. Since the participant B is a general participant, the processor 24 displays, in the display area 42B, a list of messages (for example, the messages M1, M2, and M6) transmitted to a channel that is linked to the project AAA and for which a participant who does not have certain permission or more is permitted to access. The processor 24 does not display, in the display area 42B, messages (for example, the messages M3, M4, and M5) transmitted to a channel that is linked to the project AAA and for which only a participant having certain permission or more is permitted to access. In the example shown in FIG. 13, contents of the messages M3, M4, and M5 are not displayed, and only frames displaying the messages M3, M4, and M5 are displayed, or the messages M3, M4, and M5 are painted out and displayed. The messages M3, M4, and M5 may not be displayed at all.

In response to a request from the participant B, the processor 24 may grant an access right to the messages M3, M4, and M5 to the participant B, or may request a person having permission to grant an access right, such as an administrator of the project AAA, to grant the access right to the participant B. When the person having permission to grant an access right permits to grant the access right to the participant B, the processor 24 grants the access right to the participant B. When the person having permission to grant an access right does not permit to grant the access right to the participant B, the processor 24 does not grant the access right to the participant B. When the access right is granted to the participant B, the processor 24 displays the contents of the messages M3, M4, and M5 in the display area 42B.

The processor 24 displays, in the display area 46B, a list of files stored in a repository for which the participant B has an access right and that is different from a repository linked to the project AAA. The files displayed in the display area 46B are examples of the third file. For example, a file stored in an individual repository of the participant B is displayed in the display area 46B. As described with reference to FIG. 8, a repository in which a file to be displayed in the display area 46B is stored is set by the participant B, and the file is displayed in the display area 46B according to the setting.

The first access right may be set for each file. The second access right may be set for each message.

For example, the first access right to the file F1 is not granted to the participant B, but is granted to the participant A. In this case, the participant A is permitted to access the file F1, and the file F1 is displayed in the display area 40A on the screen 38A of the participant A. The participant B is not permitted to access the file F1, and the file F1 is not displayed in the display area 40B on the screen 38B of the participant B. The same applies to other files. In this manner, the first access right may be separately set for each file.

For example, the second access right to the message M1 is not granted to the participant B, but is granted to the participant A. In this case, the participant A is permitted to access the message M1, and the message M1 is displayed in the display area 42A on the screen 38A of the participant A. The participant B is not permitted to access the message M1, and the message M1 is not displayed in the display area 42B on the screen 38B of the participant B. The same applies to other messages. In this manner, the second access right may be separately set for each message.

A message transmitted to a mailing list in which only a participant having certain permission or more is included in a destination may be displayed only on the display of the terminal device 16 of the participant having certain permission or more. For example, such a message is displayed in the display area 42 on the screen 38A of the participant A, but is not displayed in the display area 42 on the screen 38B of the participant B.

(Grant Access Right to File)

When a file (that is, the third file) stored in a repository for which a participant (for example, the participants A and B) has an access right and that is different from a repository linked to the project AAA is associated with a message displayed in a display area (for example, the display areas 42A and 42B) in which a message transmitted to a messaging service linked to the project AAA is displayed, the processor 24 may grant an access right to the associated third file to another participant having the second access right to the message associated with the third file. In this case, the processor 24 displays the associated third file on the display of the terminal device 16 of the another participant who is granted with the access right to the third file. For example, the processor 24 displays the third file in the display area 40 in which a file is displayed.

Figure 14:
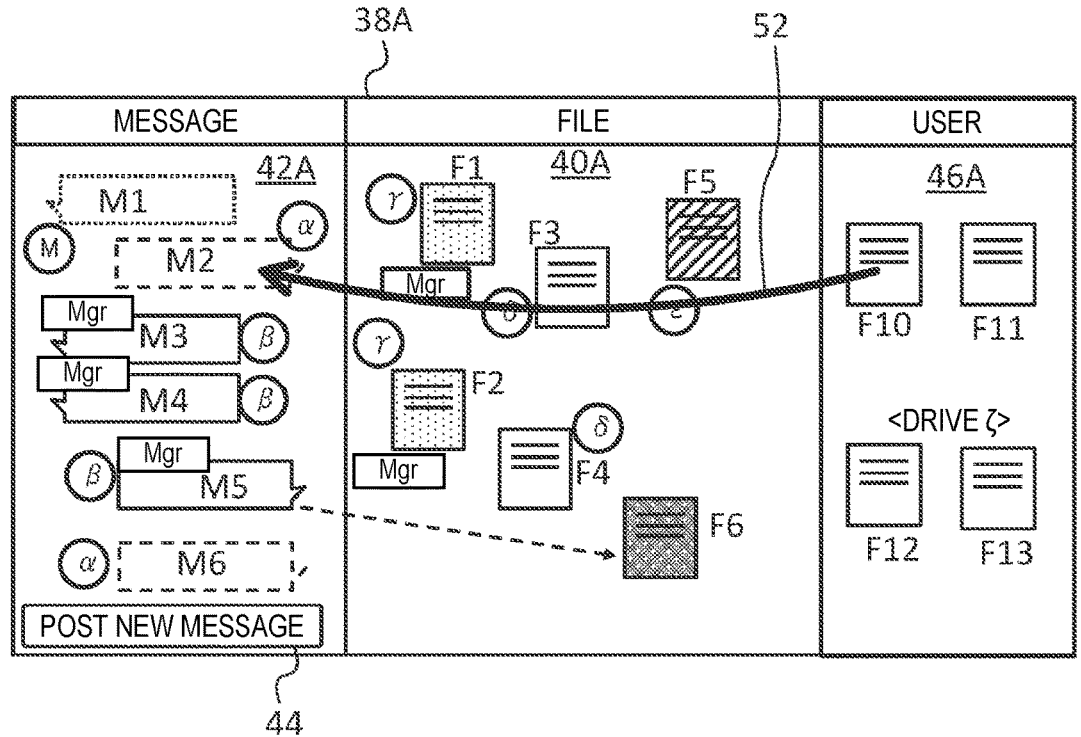
FIG. 14 is a diagram showing a screen.

Hereinafter, a processing of granting an access right to the third file to another participant will be described with reference to FIG. 14. FIG. 14 shows the screen 38A displayed on the display of the terminal device 16A of the participant A. Here, for example, the participant A associates the third file with the message.

As described above, a file (that is, the third file) stored in a repository for which the participant A has an access right and that is different from a repository linked to the project AAA is displayed in the display area 46A. In the example shown in FIG. 14, the files F10 to F13 that are examples of the third file are displayed in the display area 46A.

For example, when the participant A drags the file F10 displayed in the display area 46A to the message M2 displayed in the display area 42A as indicated by the reference numeral 52 and drops the file F10 in the message M2, the processor 24 associates the file F10 with the message M2. The processor 24 grants an access right to the associated file F10 to another participant who has the second access right to the message M2 associated with the file F10. For example, when the participant B has the second access right to the message M2, the processor 24 displays the file F10 in the display area 40B on the screen 38B of the participant B. In this manner, the file F10 is displayed for the another participant (for example, the participant B) who has the second access right to the message M2, and the file F10 is shared between the participant A and the another participant. The processor 24 also displays the file F10 in the display area 40A on the screen 38A of the participant A in which the file F10 is associated with the message M2.

Figure 15:
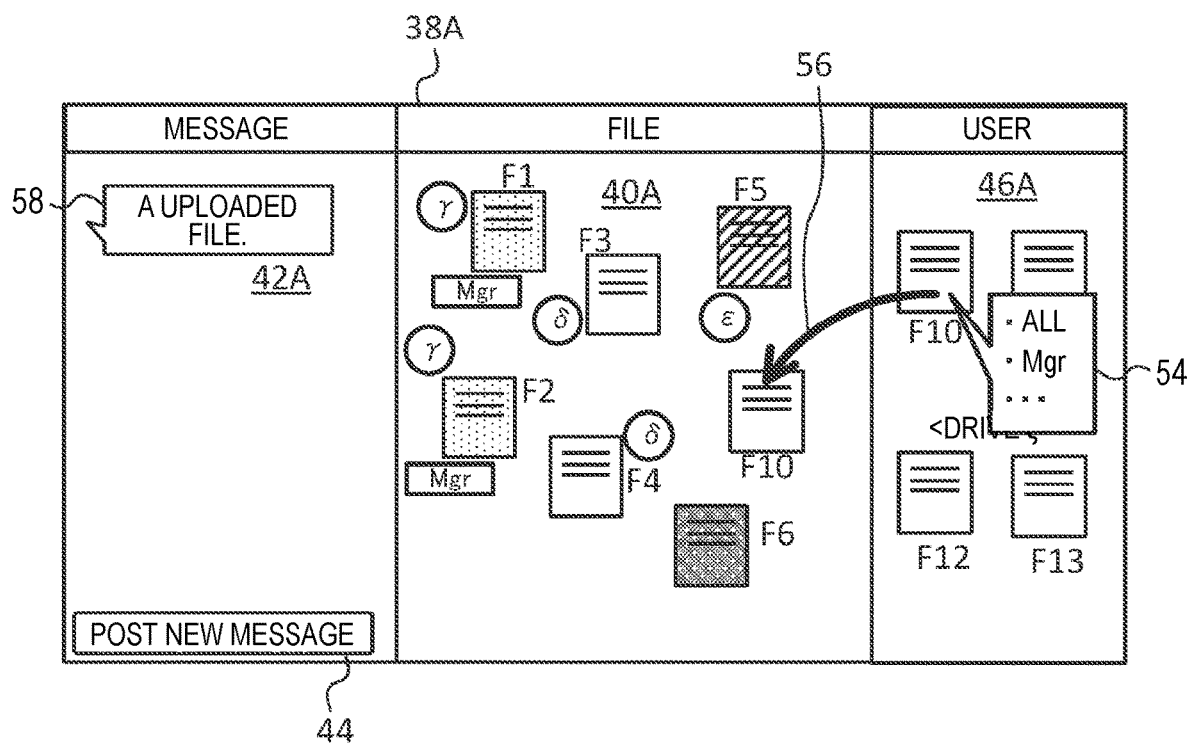
FIG. 15 is a diagram showing a screen.

Hereinafter, another processing of granting an access right to the third file to another participant will be described with reference to FIG. 15. FIG. 15 shows the screen 38A. Here, for example, an access right to the third file designated by the participant A is granted to the another participant.

For example, when the participant A designates the file F10 displayed in the display area 46A and gives an instruction to display permission menu (for example, by right-clicking), the processor 24 displays a menu 54 on the screen 38A. A list of permission of other participants who are granted with an access right to the file F10 is displayed in the menu 54. When the participant A selects permission from the menu 54, the processor 24 grants an access right to the file F10 to another participant who has the selected permission, and displays the file F10 for the another participant.

For example, when the participant A selects the permission "all", the processor 24 grants an access right to the file F10 to all participants of the project AAA, and displays the file F10 for all of the participants. For example, the file F10 is displayed in the display area 40B on the screen 38B of the participant B. The same applies to a participant other than the participant B. As indicated by the reference numeral 56, the file F10 is also displayed in the display area 40A on the screen 38A of the participant A.

When the participant A selects permission "Mgr", the processor 24 grants an access right to the file F10 only to a participant having certain permission or more, and displays the file F10 only for the participant having certain permission or more. For example, since the participant B is not a participant having certain permission or more, the file F10 is not displayed in the display area 40B on the screen 38B.

When an access right to the file F10 is granted to another participant in accordance with an instruction of the participant A, the processor 24 may display a message indicating that the access right to the file F10 is granted to another participant in a display area (for example, the display areas 42A and 42B) in which a message transmitted to a channel linked to the project AAA is displayed. In the example shown in FIG. 15, a message 58 having content of "the participant A uploaded the file" is displayed in the display area 42A. The message 58 is also displayed in the display area 42 of another participant. The message 58 may be displayed for another participant who is granted with an access right to the file F10, and may not be displayed for the participant who is not granted with an access right to the file F10.

Figure 16:
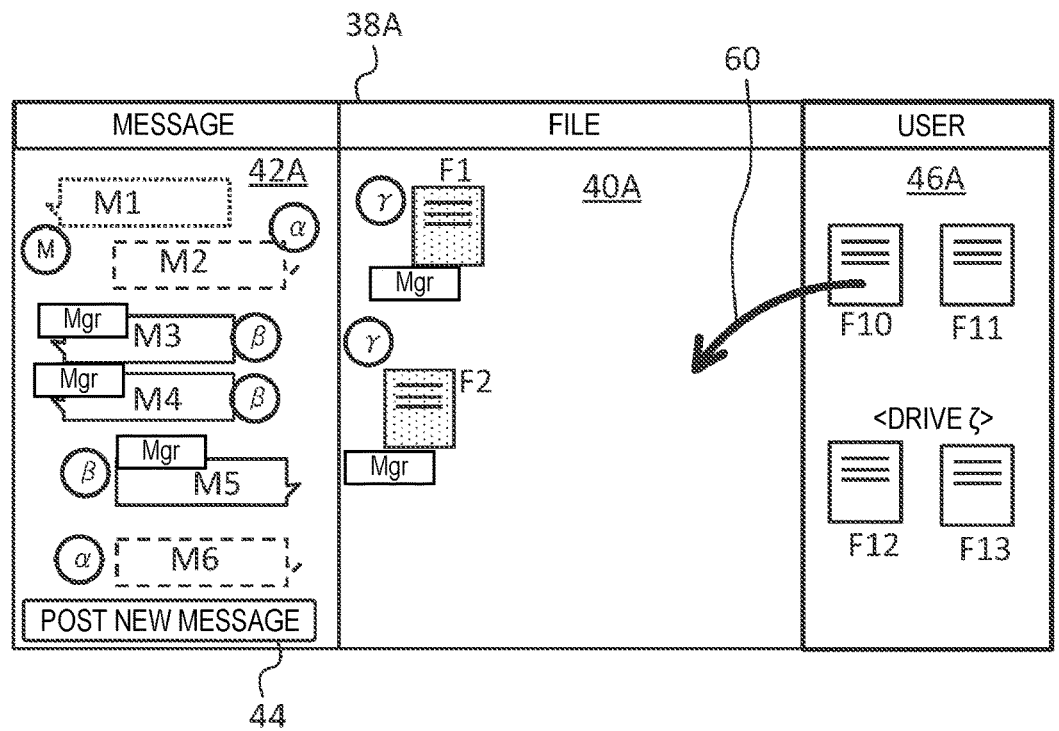
FIG. 16 is a diagram showing a screen.

Hereinafter, another processing of granting an access right to the third file to another participant will be described with reference to FIG. 16. FIG. 16 shows the screen 38A. Here, for example, an access right to the third file designated by the participant A is granted to the another participant.

For example, when the participant A gives an instruction to execute the filter function based on permission to the display area 40A, the processor 24 displays a file in the display area 40A in accordance with the permission set by the filter function. In this state, when the participant A drags and drops a file displayed into the display area 46A to the display area 40A, the processor 24 grants an access right to the file to another participant having the permission set by the filter function.

For example, when the participant A selects the permission "Mgr" by the filter function, the processor 24 displays only a file for which only a participant having the permission is permitted to access in the display area 40A. At this time, the display area 40A is in a state in which only the file for which only a participant having the permission "Mgr" is permitted to access is displayed. When the participant A drags and drops the file F10 into the display area 40A in this state as indicated by a reference numeral 60, the processor 24 grants an access right to the file F10 to another participant having the permission "Mgr". That is, the processor 24 displays the file F10 in the display area 40 on the screen 38 of the another participant.

In another example, when the participant A posts a file displayed in the display area 46A to a channel of a messaging service linked to the project AAA or attaches a file to an e-mail and transmits the e-mail, the processor 24 may grant an access right to the file to another participant who has the second access right to the channel.

Second Exemplary Embodiment

Hereinafter, a second exemplary embodiment will be described. An information processing system according to the second exemplary embodiment has the same configuration as the information processing system according to the first exemplary embodiment, and each of the file management server 10, the messaging server 12, the linkage server 14, and the terminal device 16 according to the second exemplary embodiment has the same configuration as the file management server 10, the messaging server 12, the linkage server 14, and the terminal device 16 according to the first exemplary embodiment.

In the second exemplary embodiment, when a message displayed in the display area 42 is operated by a participant, in response to the operation, the processor 24 displays a file associated with the operated message (hereinafter, referred to as an "associated file") in the display area 40 so as to indicate the file.

On the contrary, when a file displayed in the display area 40 is operated by a participant, in response to the operation, the processor 24 displays a message associated with the operated file (hereinafter referred to as an "associated message") in the display area 42 so as to indicate the message.

In the second exemplary embodiment, the display area 40 is an example of a second display area, and the display area 42 is an example of a first display area.

(Processing of Displaying Associated File)

Hereinafter, a processing of displaying an associated file in response to an operation on a message will be described in detail.

The associated file is, for example, a file attached to an operated message, a file that is to be operated and is indicated by the operated message, a file attached to a specific message associated with the operated message, a file that is to be operated and is indicated by the specific message, or the like.

The specific message is, for example, a message of a reply destination of the operated message, a message of a reply source of the operated message, a message related to the same topic as the operated message, or the like. For example, plural messages including a common specific word or a common hashtag may be determined as messages related to the same topic, plural messages exchanged using the same messaging service may be determined as messages related to the same topic, or plural messages exchanged using the same channel may be determined as messages related to the same topic. A message related to the same topic as the operated message may be specified using a known technique described in JP-A-2018-60508 or the like.

Figure 17:
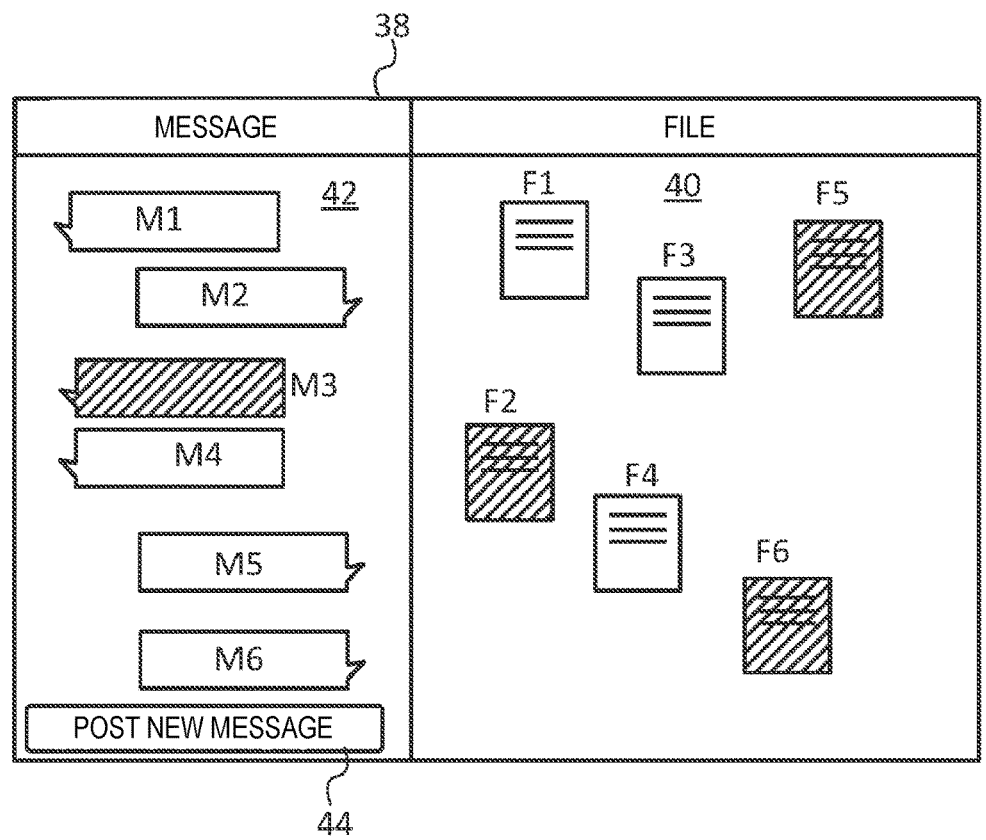
FIG. 17 is a diagram showing a screen.

A specific example will be described with reference to FIG. 17. FIG. 17 shows the screen 38. Similar to the screen 38 (see FIG. 6) according to the first exemplary embodiment described above, the screen 38 includes the display area 40 in which a file stored in a repository linked to an activity is displayed, and the display area 42 in which a message transmitted to a channel linked to an activity is displayed. Similar to the first exemplary embodiment, the activity is, for example, the project AAA in the second exemplary embodiment.

For example, when a participant selects the message M3 displayed in the display area 42 by clicking, tapping, voice, or the like, the processor 24 displays an associated file in the display area 40 so as to indicate the associated file of the selected message M3.

For example, the files F2, F5, and F6 are examples of the associated file. The processor 24 displays the files F2, F5, and F6 in the display area 40 so as to identify that the files F2, F5, and F6 are associated files of the message M3. For example, the processor 24 displays the files F2, F5, and F6 in the display area 40 in a conspicuous manner so that the files F2, F5, and F6 can be distinguished from other files. Specifically, the processor 24 may highlight the files F2, F5, and F6, decorate the files F2, F5, and F6, enlarge and display the files F2, F5, and F6, or display the files F2, F5, and F6 in a specific color.

The display area 40 is an area that can be moved such as scrolling, and a file may be displayed in the display area 40 or may not be displayed in the display area 40 in accordance with the scrolling of the display area 40.

Similarly, the display area 42 is an area that can be moved such as scrolling, and a message may be displayed in the display area 42 or may not be displayed in the display area 42 according to the scrolling of the display area 42.

Figure 18:
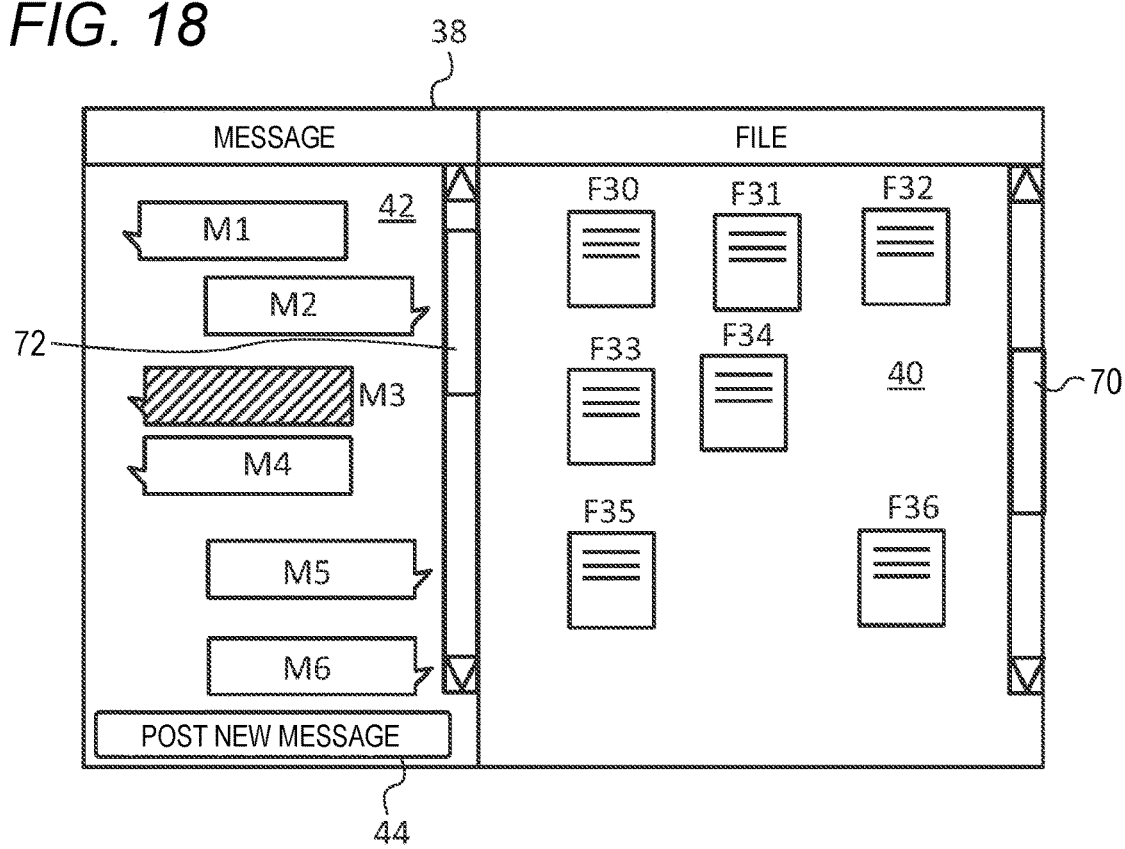
FIG. 18 is a diagram showing a screen.

For example, as shown in FIG. 18, a scroll bar 70 is displayed in the display area 40, and a scroll bar 72 is displayed in the display area 42. The scroll bar 70 has a function of scrolling the display area 40 in the upper-lower direction. The scroll bar 72 has a function of scrolling the display area 42 in the upper-lower direction. A participant scrolls the display area 40 in the upper-lower direction by operating the scroll bar 70 to display a file outside the display area 40 in the display area 40, or moves a file inside the display area 40 to the outside of the display area 40 so that the file is not displayed inside the display area 40. Similarly, the participant scrolls the display area 42 in the upper-lower direction by operating the scroll bar 72 to display a message outside the display area 42 in the display area 40, or moves a message inside the display area 42 to the outside of the display area 42 so that the message is not displayed inside the display area 42. The display areas 40 and 42 may be scrolled in the upper-lower direction and the left-right direction, or may be scrolled only in the left-right direction.

In the example shown in FIG. 18, files F30 to F36 are displayed in the display area 40, and the files F2, F5, and F6 that are associated files of the message M3 are not displayed in the display area 40. That is, the files F2, F5, and F6 do not fit in the display area 40 and are arranged outside the display area 40. In this state, when a participant selects the message M3 displayed in the display area 42, the processor 24 scrolls the display area 40 so that the files F2, F5, and F6 that are associated files of the message M3 are displayed in the display area 40. That is, the processor 24 scrolls the display area 40 so that the files F2, F5, and F6 outside the display area 40 are displayed in the display area 40.

Figure 19:
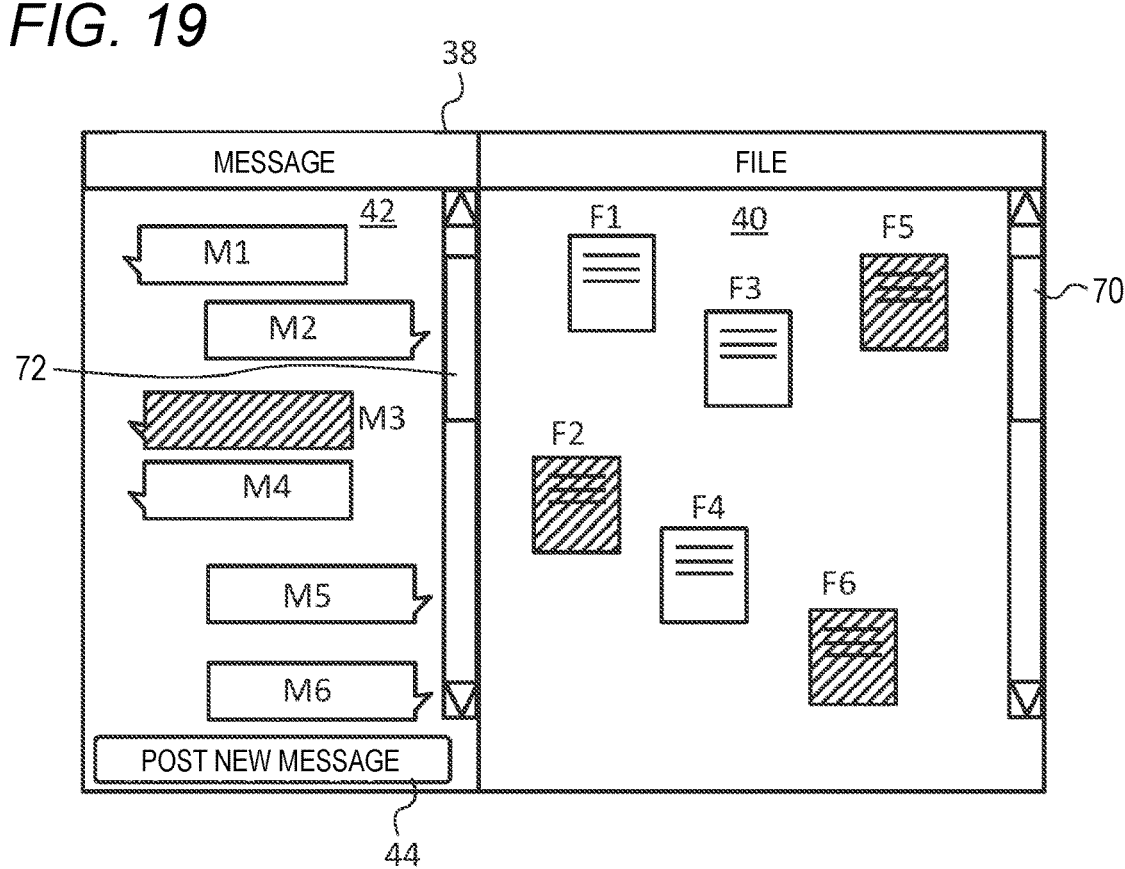
FIG. 19 is a diagram showing a screen.

FIG. 19 shows the display area 40 after scrolling. The files F2, F5, and F6 that are associated files of the message M3 are displayed in the display area 40 after the scrolling. In this manner, the files F2, F5, and F6 that are associated files of the selected message M3 are displayed in the display area 40 by scrolling the display area 40. As described with reference to FIG. 17, the processor 24 displays the files F2, F5, and F6 in the display area 40 in a conspicuous manner so that the files F2, F5, and F6 can be distinguished from other files.

When the files F2, F5, and F6 that are associated files do not fit together in the display area 40 even if the display area 40 is scrolled (that is, when the files F2, F5, and F6 are not displayed together in the display area 40), the processor 24 may display the files F2, F5, and F6 together in the display area 40 by changing a position of each of the files F2, F5, and F6 in the display area 40. When the message M3 is unselected, the processor 24 may return the positions of the files F2, F5, and F6 to original positions.

In another example, when a participant selects the message M3 in a state shown in FIG. 18, the processor 24 may change the positions of the files F2, F5, and F6 that are associated files of the message M3 in the display area 40 and display the files F2, F5, and F6 together in the display area 40 without scrolling the display area 40.

The processor 24 may display at least a specific associated file among the associated files of the selected message in the display area 40.

The specific associated file is, for example, a file having a highest degree of association to the selected message, an oldest file or a newest file among the associated files when the files are displayed according to a timeline notation, or a file having the same position in time series as the selected message when the file and the message are displayed according to a timeline notation. The file having the highest degree of association is, for example, a file attached to the selected message, or a file in a case where there is a character string designating the file in the selected message. For example, when the number of associated files of the selected message is equal to or larger than a threshold, the processor 24 displays at least a specific associated file among the associated files in the display area 40.

The processor 24 may change brightness of highlight display of an associated file, decoration of the associated file, a size of the associated file, or a color of the associated file according to a degree of association between the selected message and the file. For example, the degree of association of the file attached to the selected message is the highest, the degree of association of a file that is to be operated and is indicated by the selected message is the second highest, the degree of association of a file attached to the specific message associated with the selected message is the third highest, and the degree of association of a file that is to be operated and is indicated by the specific message is the fourth highest. It is needless to say that the degree of association is merely an example, and the degree of association may be set by an administrator or the like.

Figure 20:
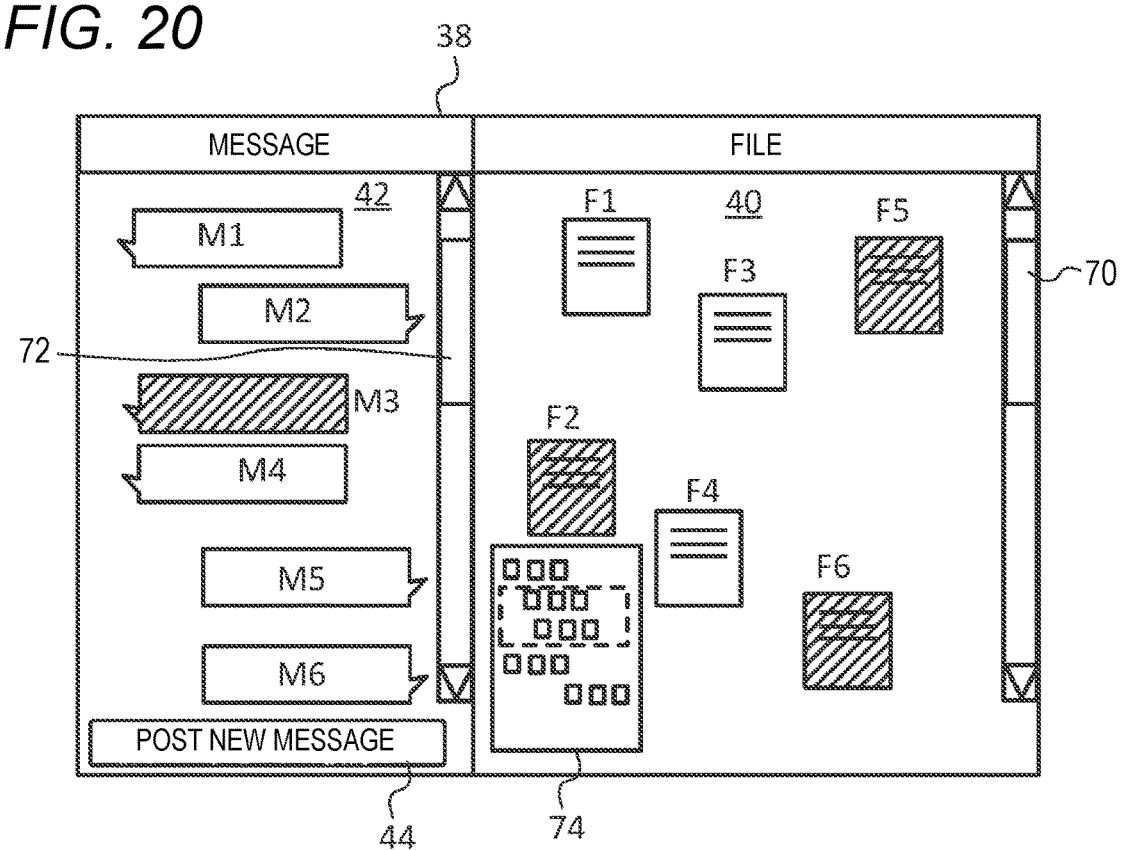
FIG. 20 is a diagram showing a screen.

As shown in FIG. 20, the processor 24 may display, in the display area 40, an image 74 representing, in a reduced manner, the entire area in which files are arranged. The display area 40 is a partial area of the entire area. When a participant designates a position in the entire area represented in the image 74, the processor 24 scrolls the display area 40 to the designated position. The image 74 may be displayed when the participant gives a display instruction, or may be displayed regardless of whether the participant gives a display instruction.

In a case where an associated file does not fit in the display area 40 and is arranged outside the display area 40, when a participant gives an instruction to display a subsequent associated file (for example, when the participant presses a "→" button, a "←" button, or the like), the processor 24 may display a subsequent associated file of the selected associated files in the display area 40 according to the instruction.

Figure 21:
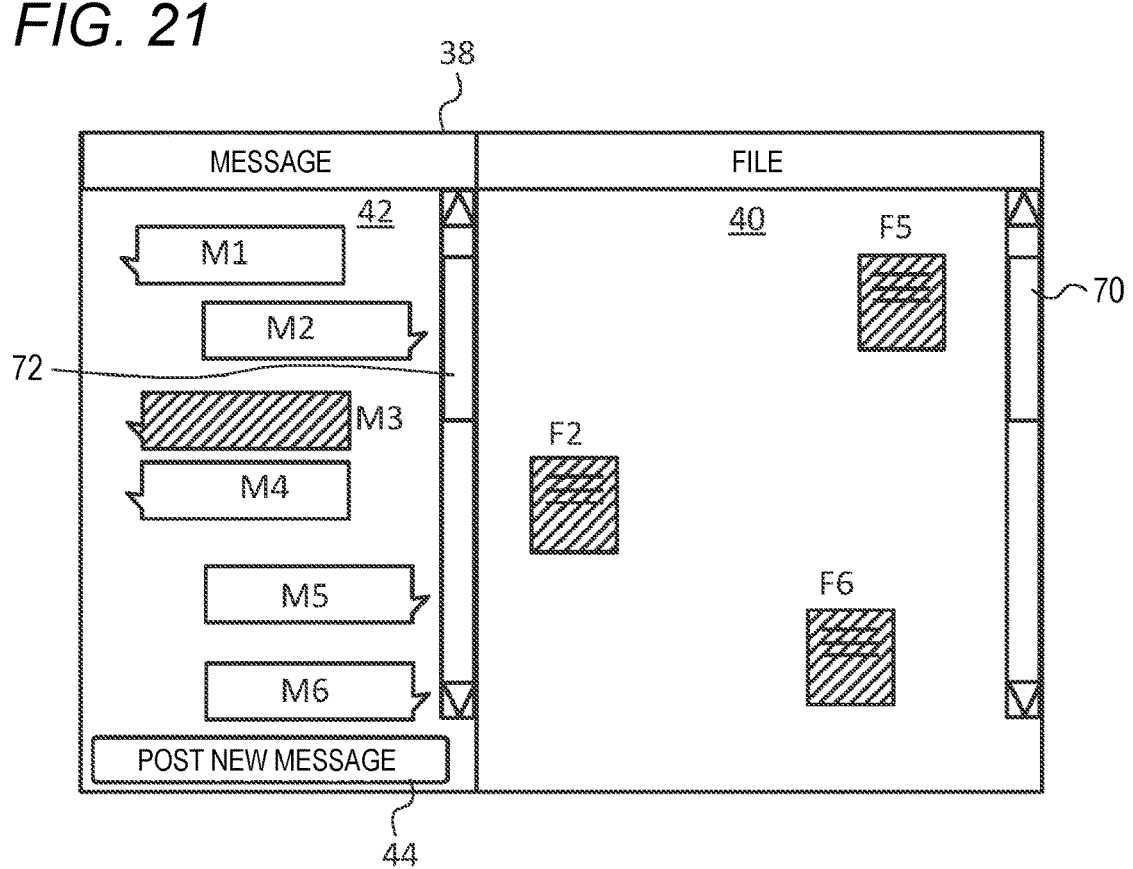
FIG. 21 is a diagram showing a screen.

The processor 24 may not display a file other than the associated file in the display area 40. For example, when the message M3 is selected by a participant, as shown in FIG. 21, the processor 24 displays files F2, F5, and F6 that are associated files of the message M3 in the display area 40, and does not display a file other than the files F2, F5, and F6 in the display area 40. The processor 24 may not display the file other than the associated files in the display area 40 when the number of associated files is equal to or larger than a threshold (see FIG. 21), and may display the file other than the associated files in the display area 40 when the number of associated files is smaller than the threshold (see FIGS. 17 and 19).

In a case where a file other than the associated file is not displayed in the display area 40, when a participant gives an instruction to display the file other than the associated file, the processor 24 displays the file other than the associated file in the display area 40. For example, when a button for giving an instruction to display the file other than the associated file is displayed on the screen 38 and the participant presses the button, the processor 24 displays the file other than the associated file in the display area 40.

(Processing of Displaying Associated Message)

Hereinafter, a processing of displaying an associated message in response to an operation on a file will be described in detail.

The associated message is, for example, a message to which an operated file is attached, a context message related to the operated file, a message before and after the message to which the operated file is attached (for example, a message transmitted immediately before or a message transmitted immediately after), a message before and after the context message related to the operated file (for example, a message transmitted immediately before or a message transmitted immediately after), a message to which a specific file associated with a selected file is attached, or a context message related to the specific file associated with the selected file.

The specific file is, for example, a file of an updated version of the operated file or a file grouped by a participant. When a participant groups plural files including the operated file, the grouped file is the specific file. For example, in a case where a participant can change the position of a file in the display area 40, when files are grouped by the participant, the grouped file is the specific file.

The context message related to a file is a message indicating a status of the file, content of an operation on the file, and the like. The message 58 shown in FIG. 15 is an example of the context message related to a file. That is, in a case where a file stored in an individual repository of the participant is dragged and dropped into the display area 40 in accordance with an instruction of the participant and an access right to the file is granted to another participant, the message 58 is displayed in the display area 42. The message 58 indicates content of an operation on the file, such as uploading, and can be referred to as a context message related to the file. For example, when the file displayed in the display area 40 is selected by the participant, the context message is displayed in the display area 42 as an associated message.

The processor 24 may record history of an operation of each participant and store information indicating the history (hereinafter, referred to as "history information") in a memory such as the memory 22. The history information is, for example, information indicating who, what kind of operation, on what, and when. For example, the processor 24 associates information for identifying a participant who performed an operation, information for identifying a target of the operation (for example, a file, a message, or the like), information indicating date and time when the operation was performed, and information indicating content of the operation with one another, and stores and manages these pieces of information in a memory such as the memory 22. A file or a message may be retrieved using the history information. For example, when a user such as a participant designates information included in the history information and gives an instruction to retrieve a file or a message, the processor 24 retrieves a file or a message matching the designated condition and outputs a retrieve result. For example, the retrieve result is displayed on the display of the terminal device 16.

Figure 22:
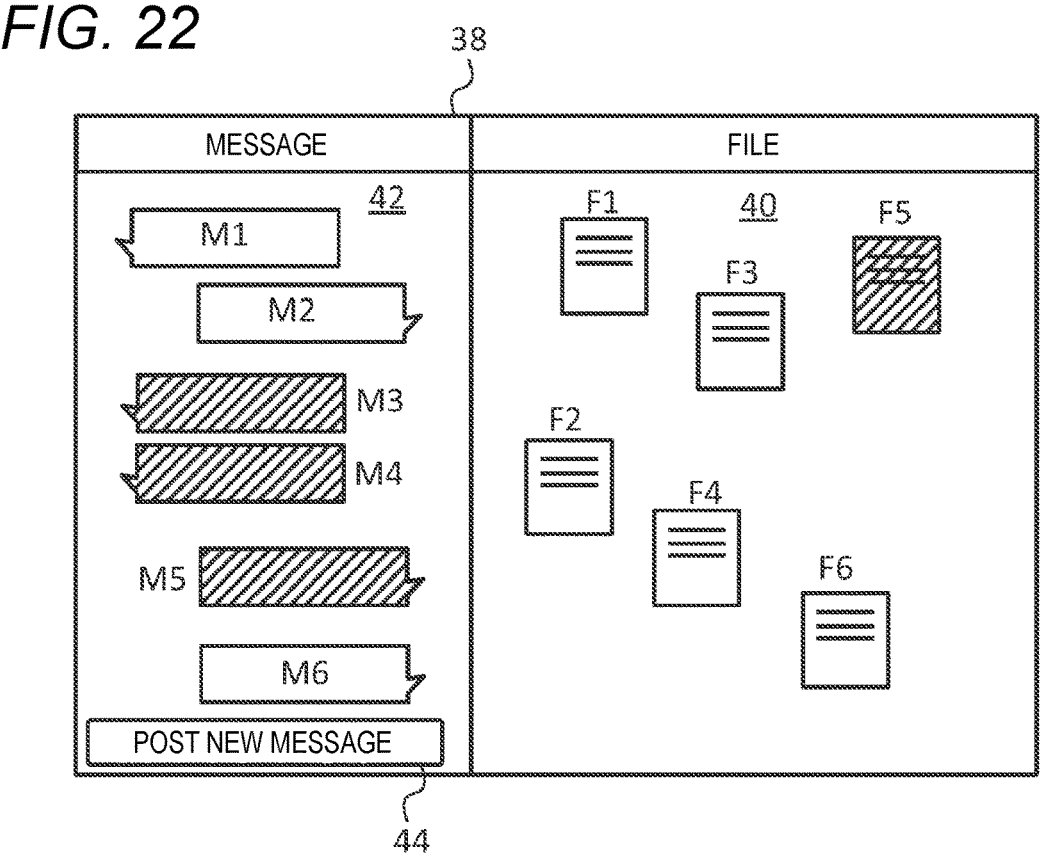
FIG. 22 is a diagram showing a screen.

A specific example will be described with reference to FIG. 22. FIG. 22 shows the screen 38. Similar to the screen 38 (see FIG. 6) according to the first exemplary embodiment described above, the screen 38 includes the display area 40 in which a file stored in a repository linked to an activity is displayed, and the display area 42 in which a message transmitted to a channel linked to an activity is displayed. The activity is, for example, the project AAA.

For example, when a participant selects the file F5 displayed in the display area 40 by clicking, tapping, voice, or the like, the processor 24 displays an associated message in the display area 42 so as to indicate the associated message of the selected file F5.

For example, the messages M3, M4, and M5 are examples of an associated message. The processor 24 displays the messages M3, M4, and M5 in the display area 42 so as to identify that the messages M3, M4, and M5 are associated messages of the file F5. For example, the processor 24 displays the messages M3, M4, and M5 in the display area 42 in a conspicuous manner so that the messages M3, M4, and M5 can be distinguished from other messages. Specifically, the processor 24 may highlight the messages M3, M4, and M5, may decorate the messages M3, M4, and M5, may enlarge and display the messages M3, M4, and M5, or may display the messages M3, M4, and M5 in a specific color.

As described with reference to FIG. 18, the display areas 40 and 42 may be scrolled. For example, as shown in FIG. 23, the scroll bar 70 is displayed in the display area 40, and the scroll bar 72 is displayed in the display area 42.

Figure 23:
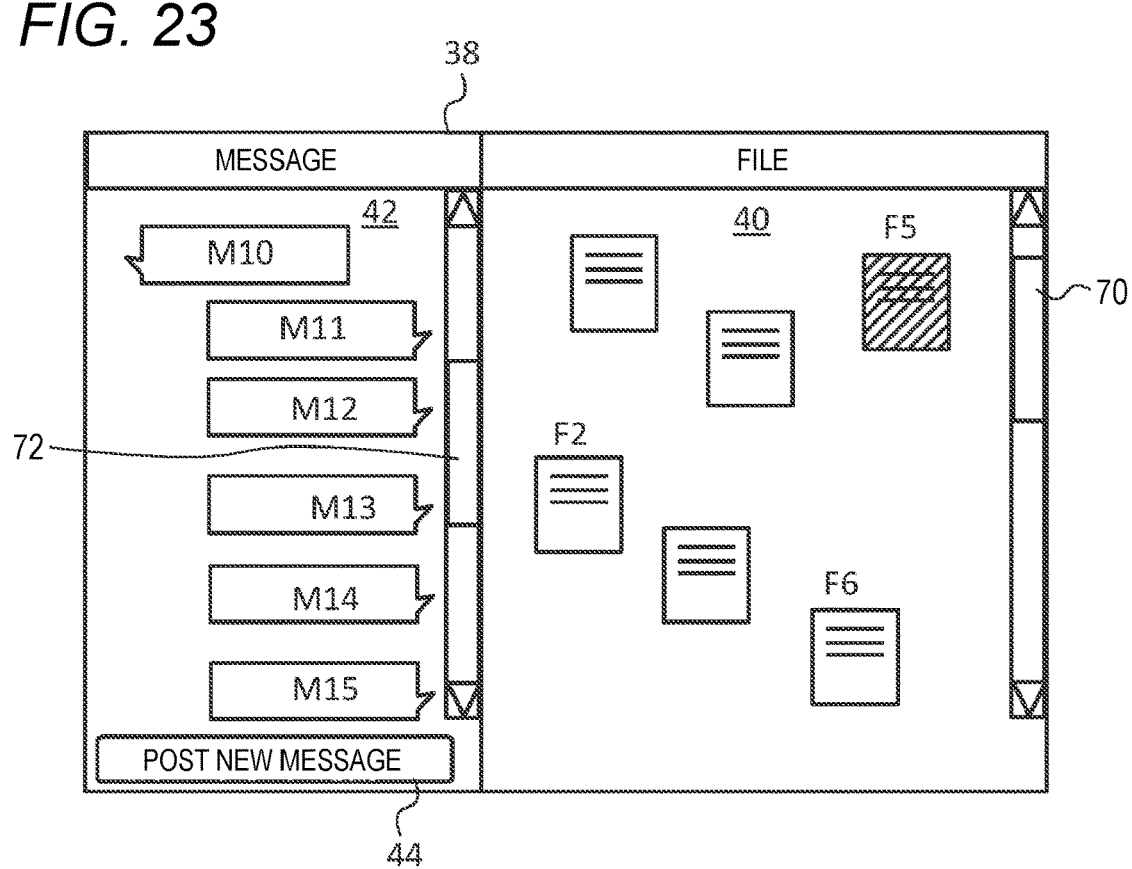
FIG. 23 is a diagram showing a screen.

In the example shown in FIG. 23, messages M10 to M15 are displayed in the display area 42, and the messages M3, M4, and M5 that are associated messages of the file F5 are not displayed in the display area 42. That is, the messages M3, M4, and M5 do not fit in the display area 42 and are arranged outside the display area 42. In this state, when a participant selects the file F5 displayed in the display area 40, the processor 24 scrolls the display area 42 so that the messages M3, M4, and M5 that are associated messages of the file F5 are displayed in the display area 42. That is, the processor 24 scrolls the display area 42 so that the messages M3, M4, and M5 outside the display area 42 are displayed in the display area 42.

Figure 24:
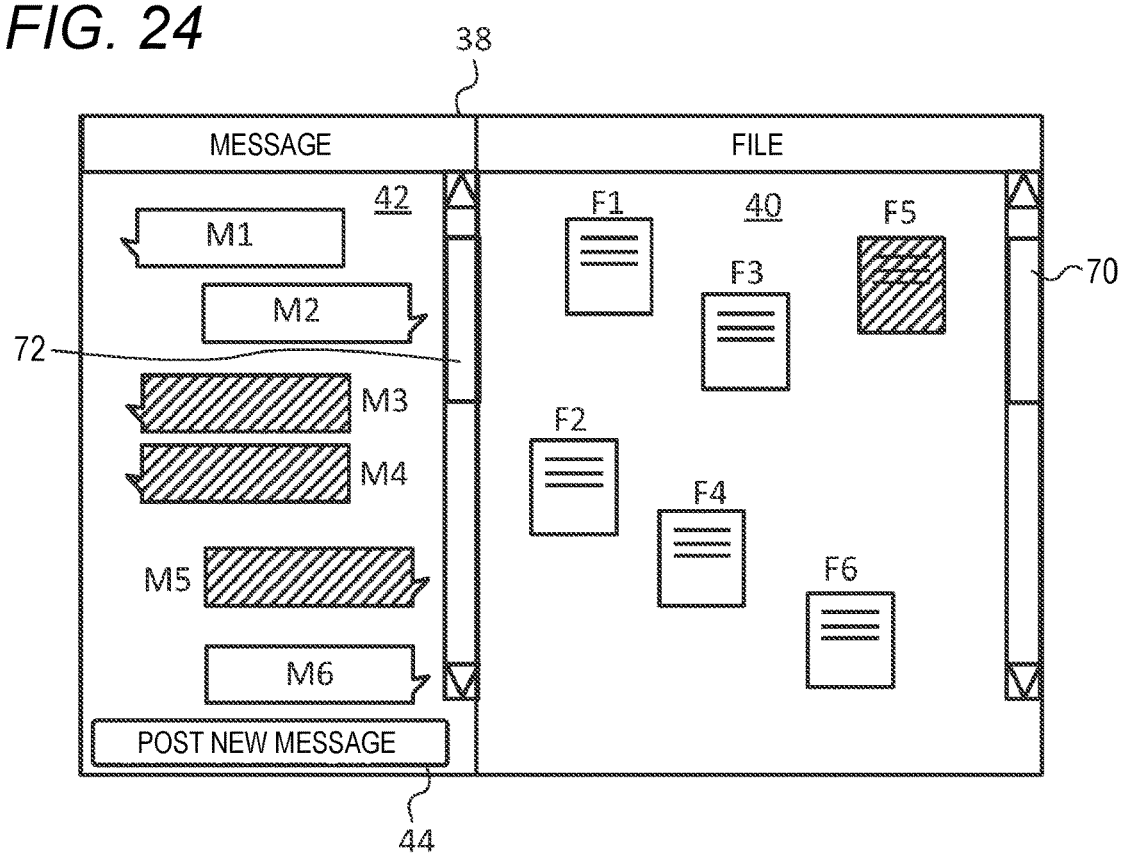
FIG. 24 is a diagram showing a screen.

FIG. 24 shows the display area 42 after scrolling. The messages M3, M4, and M5 that are associated messages of the file F5 are displayed in the display area 42 after the scrolling. In this manner, the messages M3, M4, and M5 that are associated messages of the selected file F5 are displayed in the display area 42 by scrolling the display area 42. As described with reference to FIG. 22, the processor 24 displays the messages M3, M4, and M5 in the display area 42 in a conspicuous manner so that the messages M3, M4, and M5 can be distinguished from other messages.

When the messages M3, M4, and M5 that are associated messages do not fit together in the display area 42 even if the display area 42 is scrolled (that is, when the messages M3, M4, and M5 are not displayed together in the display area 42), the processor 24 may display the messages M3, M4, and M5 together in the display area 42 by changing positions of the messages M3, M4, and M5 in the display area 42. When the file F5 is unselected, the processor 24 may return the positions of the messages M3, M4, and M5 to original positions.

In another example, when a participant selects the file F5 in the state shown in FIG. 23, the processor 24 may change the positions of the messages M3, M4, and M5 that are associated messages of the file F5 in the display area 42 and display the messages M3, M4, and M5 together in the display area 42 without scrolling the display area 42.

The processor 24 may display at least a specific associated message among associated messages of a selected file in the display area 42.

The specific associated message is, for example, a message having a highest degree of association to the selected file, an oldest message or a newest message among the associated messages, or a message having the same position in time series as the selected file. The message having the highest degree of association is, for example, a message to which the selected file was attached. For example, when the number of associated messages of the selected file is equal to or larger than a threshold, the processor 24 displays at least a specific associated message among the associated messages in the display area 42.

The processor 24 may change brightness of highlight display of an associated message, decoration of the associated message, a size of the associated message, or a color of the associated message according to a degree of association between the selected file and the message.

The processor 24 may not display a message other than the associated message in the display area 42. For example, in the example shown in FIGS. 17 and 18, when a participant selects the file F5, the processor 24 displays the messages M3, M4, and M5 that are associated messages of the file F5 in the display area 42, and does not display a message other than the messages M3, M4, and M5 in the display area 42. The processor 24 may not display a message other than the associated messages in the display area 42 when the number of associated messages is equal to or larger than a threshold, and may display a message other than the associated messages in the display area 42 when the number of associated messages is less than the threshold.

In a case where a message other than the associated messages is not displayed in the display area 42, when a participant gives an instruction to display the message other than the associated messages, the processor 24 displays the message other than the associated messages in the display area 42. For example, when a button for giving an instruction to display a message other than the associated messages is displayed on the screen 38 and the participant presses the button, the processor 24 displays the message other than the associated messages in the display area 42.

Figure 25:
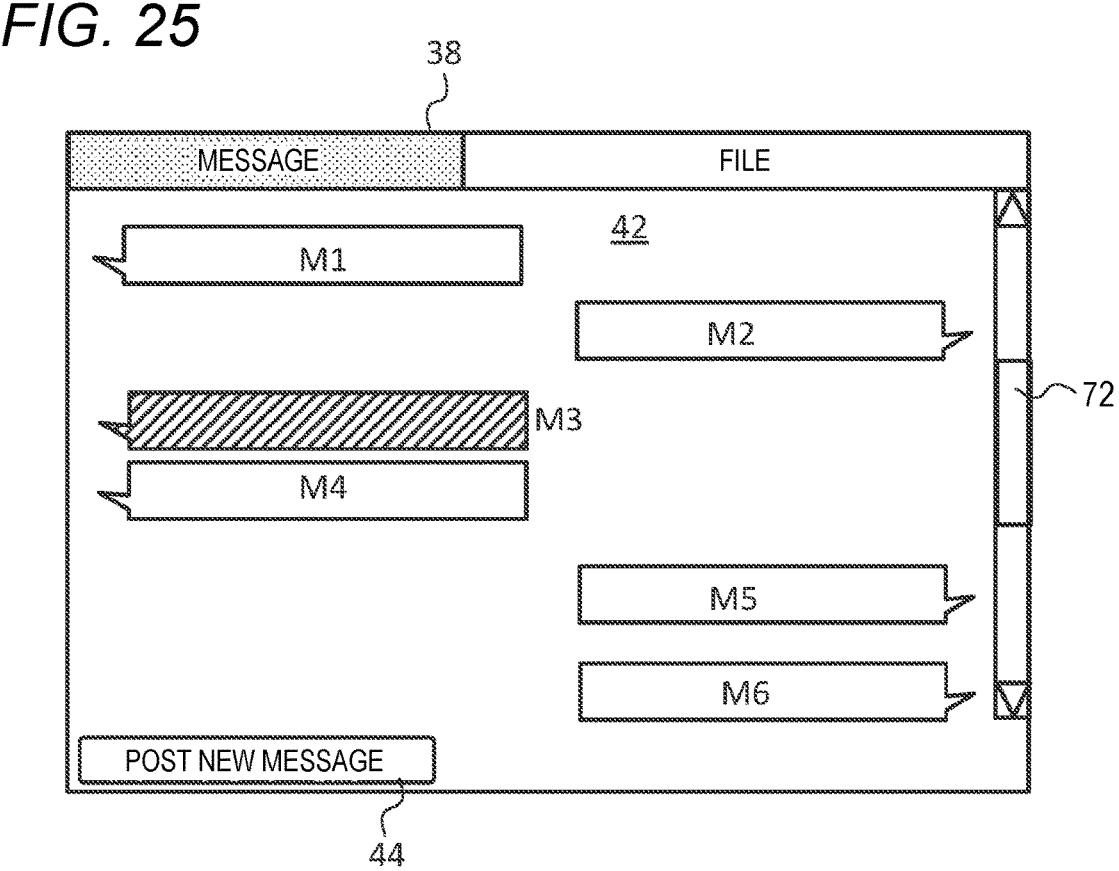
FIG. 25 is a diagram showing a screen.
Figure 26:
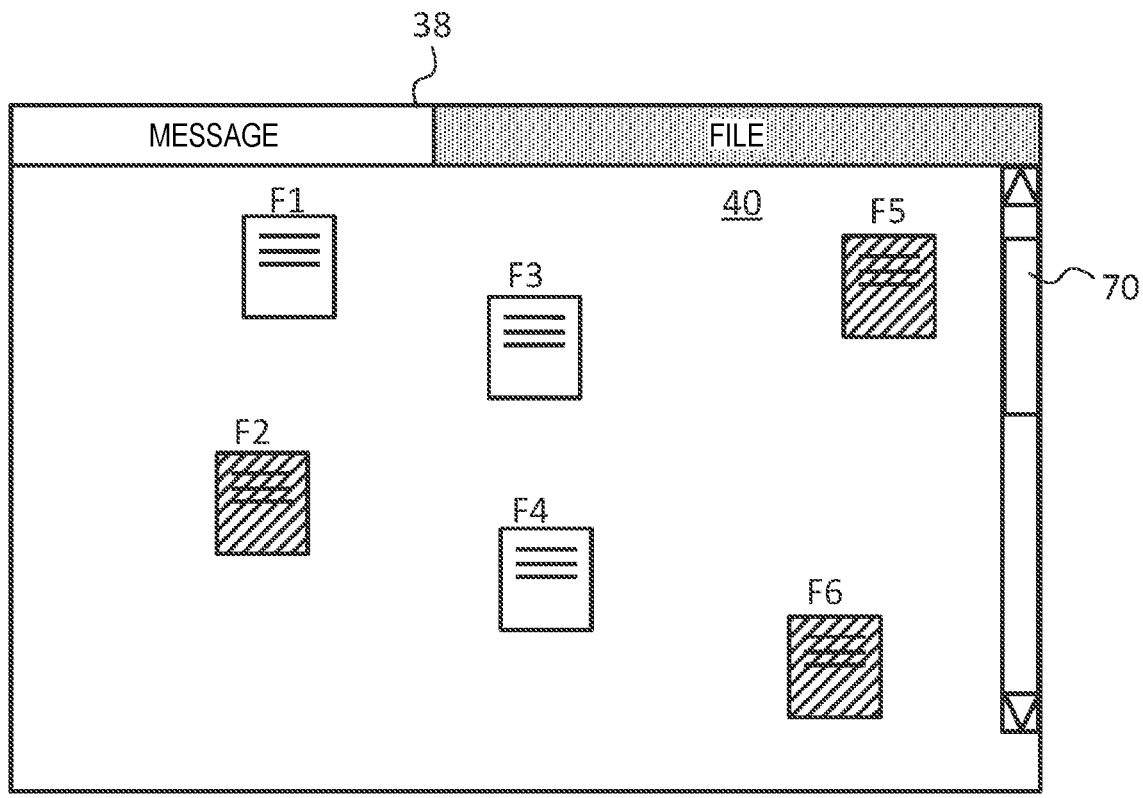
FIG. 26 is a diagram showing a screen.

The display of a file and a message may be switched by a tab. FIGS. 25 and 26 show an example of such switching. FIGS. 25 and 26 show the screen 38.

In the example shown in FIGS. 25 and 26, when a tab of message display is selected by a participant, as shown in FIG. 25, the processor 24 forms only the display area 42 for a message of the display areas 40 and 42 on the screen 38, and when a tab of file display is selected by the participant, as shown in FIG. 26, the processor 24 forms only the display area 40 for a file of the display areas 40 and 42 on the screen 38.

That is, when the tab of the message display is selected by the participant, as shown in FIG. 25, the processor 24 forms only the display area 42 of the display areas 40 and 42 on the screen 38 and displays a message in the display area 42, thereby displaying only a message of a file and a message on the screen 38.

When the tab of the file display is selected by the participant, as shown in FIG. 26, the processor 24 forms only the display area 40 of the display areas 40 and 42 on the screen 38, thereby displaying only a file among a file and a message on the screen 38.

In the screen 38 shown in FIG. 25, when the message M3 is selected by a participant and the tab of the file display is selected by the participant, the processor 24 switches a display area from the display area 42 to the display area 40 and displays the files F2, F5, and F6 that are associated files of the message M3 in the display area 40. In a case where the files F2, F5, and F6 are arranged outside the display area 40, when the message M3 is selected by the participant and the tab of the file display is selected by the participant, the processor 24 switches a display area from the display area 42 to the display area 40, scrolls the display area 40 to positions of the files F2, F5, and F6, and displays the files F2, F5, and F6 in the display area 40.

In the screen 38 shown in FIG. 26, when the file F5 is selected by the participant and the tab of the message display is selected by the participant, the processor 24 switches a display area from the display area 40 to the display area 42 and displays the messages M3, M4, and M5 that are associated messages of the file F5 in the display area 42. In a case where the messages M3, M4, and M5 are arranged outside the display area 42, when the file F5 is selected by the participant and the tab of the message display is selected by the participant, the processor 24 switches a display area from the display area 40 to the display area 42, scrolls the display area 42 to positions of the messages M3, M4, and M5, and displays the messages M3, M4, and M5 in the display area 42.

The display areas 40 and 42 may be displayed on the display of the terminal device 16 as separate screens (for example, separate windows). In this case as well, the processor 24 displays an associated file or an associated message by scrolling or the like in a similar manner to the tab.

As shown in FIG. 18 and the like, when the display areas 40 and 42 are areas that can be moved by scrolling or the like, the processor 24 may cause any one display area of the display area 40 and the display area 42 to follow a movement of the other display area. For example, when any one of the display area 40 and the display area 42 is scrolled by a participant, the processor 24 causes the other display area to follow the scrolling.

For example, when the display area 40 is scrolled by a participant and a file displayed in the display area 40 is changed to another file, the processor 24 scrolls the display area 42 so that an associated message of the file displayed in the display area 40 after the scrolling is displayed in the display area 42.

Similarly, when the display area 42 is scrolled by a participant and a message displayed in the display area 42 is changed to another message, the processor 24 scrolls the display area 40 so that an associated file of the message displayed in the display area 42 after the scrolling is displayed in the display area 40.

(Processing when Updated File is Selected)

When a file displayed in the display area 40 is updated and the updated file is selected, the processor 24 may display an associated message of the updated file in the display area 42. In this case, the associated message may include a message to which a file before the update is attached.

Figure 27:
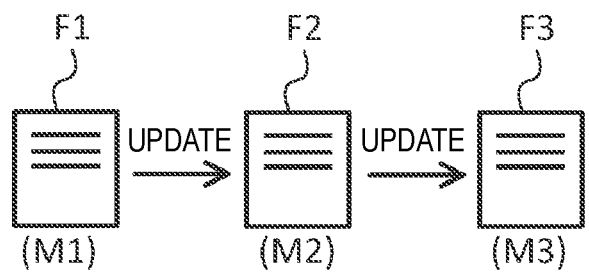
FIG. 27 is a diagram showing a file.

A processing when an updated file is selected will be described in detail with reference to FIG. 27. FIG. 27 schematically shows a file.

For example, the file F1 is attached to the message M1, the file F2 is attached to the message M2, the file F3 is attached to the message M3, the messages M1, M2, and M3 are transmitted to a channel linked to the project AAA, and the processor 24 displays a list of the messages M1, M2, and M3 in the display area 42. The processor 24 displays a list of files attached to the messages in the display area 40. Accordingly, a list of the files F1, F2, and F3 is displayed in the display area 40.

The file F2 is an updated version of the file F1. That is, the file F2 is created by performing an operation such as editing on the file F1. The file F3 is an updated version of the file F2. That is, the file F3 is created by performing an operation such as editing on the file F2. The operation such as editing may be performed on the screen 38 via the linkage server 14 or may be performed without using the linkage server 14.

Hereinafter, a specific processing when each file is selected will be described.

(1. When File F1 is Selected)

For example, when the file F1 displayed in the display area 40 is selected by a participant, the processor 24 displays the message M1 to which the file F1 is attached in the display area 42 in a distinguishable manner from other messages (for example, the messages M2 and M3). For example, the processor 24 may display only the message M1 among the messages M1, M2, and M3 in the display area 42, or may display a list of the messages M1, M2, and M3 in the display area 42 and display the message M1 in a conspicuous manner.

In another example, when the file F1 is selected by a participant, the processor 24 displays the message M1 to which the file F1 is attached and the message M2 to which the file F2 that is an updated version of the file F1 is attached in the display area 42 in a distinguishable manner from other messages. For example, the processor 24 may display only the messages M1 and M2 among the messages M1, M2, and M3 in the display area 42, or may display a list of the messages M1, M2, and M3 in the display area 42 and display the messages M1 and M2 in a conspicuous manner.

In another example, when the file F1 is selected by a participant, the processor 24 displays the message M1 to which the file F1 is attached and a message (for example, the message M2 and M3) to which all files (for example, the files F2 and F3 that are files of an updated version) derived and created from the file F1 are attached in the display area 42.

In another example, when the file F1 is selected by a participant, the processor 24 may display the message M1 to which the file F1 is attached and messages before and after the message M1 in the display area 42 in a distinguishable manner from other messages.

(2. When File F2 is Selected)

For example, when the file F2 displayed in the display area 40 is selected by a participant, the processor 24 displays the message M2 to which the file F2 is attached in the display area 42 in a distinguishable manner from other messages (for example, the messages M1 and M3). For example, the processor 24 may display only the message M2 among the messages M1, M2, and M3 in the display area 42, or may display a list of the messages M1, M2, and M3 in the display area 42 and display the message M2 in a conspicuous manner.

In another example, when the file F2 is selected by a participant, the processor 24 displays the message M2 to which the file F2 is attached and the message M1 to which the file F1 serving as a basis for creating the file F2 is attached (that is, the message M1 to which the file F1 before the update is attached) in the display area 42 in a distinguishable manner from other messages. For example, the processor 24 may display only the messages M1 and M2 among the messages M1, M2, and M3 in the display area 42, or may display a list of the messages M1, M2, and M3 in the display area 42 and display the messages M1 and M2 in a conspicuous manner.

In another example, when the file F2 is selected by a participant, the processor 24 displays, in the display area 42, the message M2 to which the file F2 is attached, the message M1 to which the file F1 serving as a basis for creating the file F2 is attached, and the message M3 to which the file F3 derived and created from the file F1 is attached.

(3. When File F3 is Selected)

For example, when the file F3 displayed in the display area 40 is selected by a participant, the processor 24 displays the message M3 to which the file F3 is attached in the display area 42 in a distinguishable manner from other messages (for example, the messages M1 and M2). For example, the processor 24 may display only the message M3 among the messages M1, M2, and M3 in the display area 42, or may display a list of the messages M1, M2, and M3 in the display area 42 and display the message M3 in a conspicuous manner.

In another example, when the file F3 is selected by a participant, the processor 24 displays the message M3 to which the file F3 is attached and the message M2 to which the file F2 serving as a basis for creating the file F3 is attached in the display area 42 in a distinguishable manner from other messages. For example, the processor 24 may display only the messages M2 and M3 among the messages M1, M2, and M3 in the display area 42, or may display a list of the messages M1, M2, and M3 in the display area 42 and display the messages M2 and M3 in a conspicuous manner.

In another example, when the file F3 is selected by a participant, the processor 24 displays the message M3 to which the file F3 is attached and messages (for example, the messages M1 and M2) to which all files (for example, the files F1 and F2) serving as a basis for creating the file F3 are attached in the display area 42.

(Processing of not Displaying File Other than Associated File)

Figure 28:
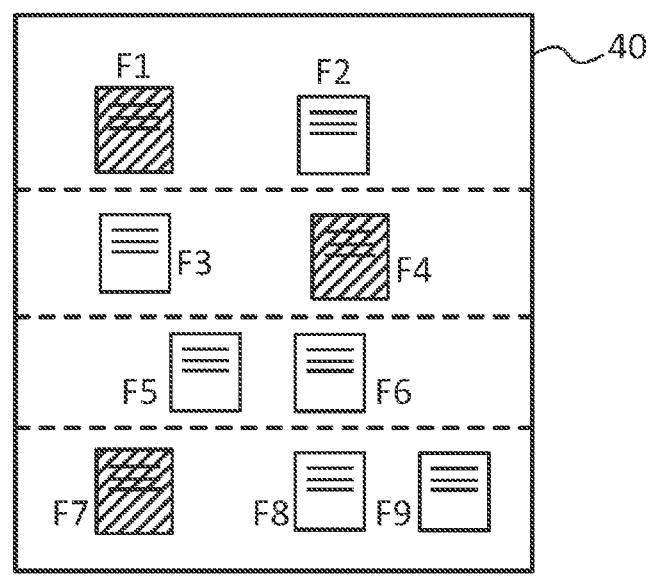
FIG. 28 is a diagram showing a display area.
Figure 29:
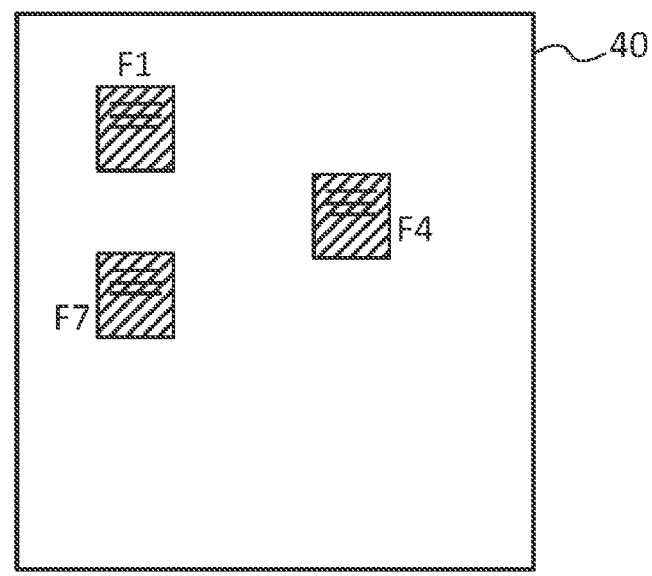
FIG. 29 is a diagram showing a display area.

Hereinafter, an example of a processing of not displaying a file other than an associated file in the display area 40 will be described with reference to FIGS. 28 and 29. FIGS. 28 and 29 show an example of the display area 40. As shown in FIG. 29, the files F1 to F9 are displayed in the display area 40. Here, for example, each file is displayed at a position designated by a participant, a position in the order of name, or the like, instead of using a timeline notation (that is, the files are not arranged in chronological order).

For example, as indicated by a broken line in FIG. 28, the processor 24 divides the display area 40 into plural individual areas. In the example shown in FIG. 28, the display area 40 is divided into plural individual areas in the upper-lower direction.

For example, the files F1, F4, and F7 are associated files of a message selected by a participant. When the messages are selected by the participant, the processor 24 displays only the files F1, F4, and F7 among the files F1 to F9 in the display area 40, and does not display files other than the files F1, F4, and F7 in the display area 40. At this time, the processor 24 deletes the individual areas in which the files other than the files F1, F4, and F7 are displayed in the display area 40, and connects the individual areas in which the files F1, F4, and F7 that are associated files are displayed. More specifically, since the files F5 and F6 are not associated files, the files F5 and F6 are not displayed. The individual areas in which the files F5 and F6 are displayed are deleted, and the individual area in which the file F4 is displayed and the individual area in which the file F7 is displayed are connected. Accordingly, the files F1, F4, and F7 that are associated files are displayed at positions closer to one another.

For example, a function of each unit of the linkage server 14 and the terminal device 16 is implemented by cooperation of hardware and software. For example, a processor of each device reads and executes a program stored in a memory of each device, thereby implementing a function of each device. The program is stored in the memory via a recording medium such as a CD and a DVD or via a communication path such as a network.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

As another aspects of the present disclosure, there are the following inventions (1) to (8).

(1) An information processing device including
a processor,
in which the processor
forms, on a display, a first display area in which a message is displayed and a second display area in which a file is display, and
in response to an operation on a file displayed in the second display area, display a message associated with the operated file in the first display area.

(2) The information processing device according to (1),
in which when an updated file is operated, the processor displays a message associated with the updated file in the first display area.

(3) The information processing device according to (2),
in which the message associated with the updated file includes a message to which a file before the update is attached.

(4) The information processing device according to any one of (1) to (3),
in which the processor does not display a message that is not associated with the operated file in the first display area.

(5) The information processing device according to any one of (1) to (4),
in which the first display area is a movable area, and a message is displayed or not displayed in accordance with a movement of the first display area,
in which the second display area is a movable area, and a file is displayed or not displayed in accordance with a movement of the second display area, and
in which in response to an operation on a file displayed in the second display area, the processor moves the first display area so as to display a message associated with the operated file.

(6) The information processing device according to (5),
in which the first display area and the second display area are display areas formed on one screen, and
in which any one display area of the first display area and the second display area is moved following a movement of the other display area.

(7) The information processing device according to any one of (1) to (6),
in which for each activity set by a user for each specific purpose, a participant is associated with the activity,
in which a storage area of a file management service for which at least one participant has an access right and that is provided by plural service provider is linked to the activity,
in which a messaging service for which at least one participant has an access right and in which at least a message is exchanged is linked to the activity,
in which in response to a request for accessing the activity from each participant, the first display area is an area displaying a message transmitted to a linked messaging service for which a participant of a request source has an access right, and
in which the second display area is an area displaying a file stored in a linked storage area for which the participant of the request source has an access right.

(8) A non-transitory computer readable medium storing a program causing a computer to execute a process, the process including:
forming, on a display, a first display area in which a message is displayed and a second display area in which a file is displayed; and
in response to an operation on a file displayed in the second display area, displaying a message associated with the operated file in the first display area.

According to the inventions of (1) and (8), a message associated with a certain file may be presented to a user.

According to the inventions of (2) and (3), a message associated with an updated file may be presented to a user.

According to the invention of (4), a message that is not associated with an operated file may be prevented from being presented to a user.

According to the inventions of (5) and (6), when a file is operated, even if a message associated with the file is not displayed in the first display area, the message may be presented to a user.

According to the invention of (7), even when a file related to an activity set for a specific purpose is managed by a file management service provided by a service provider, and a message related to the activity is managed by a messaging service, a message associated with a certain file may be presented to a user.

What is claimed is:

1. An information processing device comprising:
a processor configured to:
associate a plurality of participants of each activity set by a user for each specific purpose with the activity;
link, to the activity, a storage area of each of a plurality of file management services for which at least one of the plurality of participants associated with the activity has an access right and that is provided by a plurality of service providers;
in response to a request for accessing the activity from one of the plurality of participants associated with the activity, cause a display of the one of the plurality of participants, who made the request, to display a first file stored in the linked storage area for which the one of the plurality of participants, who made the request, has an access right;
cause the display to indicate a presence of a second file that is stored in a linked storage area for which the one of the plurality of participants, who made the request, does not have an access right; and
when files are displayed side by side in the display in accordance with a specific order, indicate the presence of the second file by ensuring a space at a position where the second file is to be displayed, and by preventing display of the first file in the space.

2. The information processing device according to claim 1,
wherein when a storage area for which the one of the plurality of participants, who made the request, has an access right includes a storage area of a plurality of file management services provided by a plurality of service providers, the processor is configured to cause the display of the one of the plurality of participants, who made the request, to display a list of a plurality of first files stored in the storage area of the plurality of file management services.

3. The information processing device according to claim 1,
wherein the processor is further configured to:
link, to the activity, a messaging service for which at least one participant has an access right and in which at least a message is exchanged; and
cause the display to display a list of third files that are transmitted to the linked messaging service for which the one of the plurality of participants, who made the request, has an access right, together with the first file.

4. The information processing device according to claim 2,
wherein the processor is further configured to:
link, to the activity, a messaging service for which at least one participant has an access right and in which at least a message is exchanged; and
cause the display to display a list of third files that are transmitted to the linked messaging service for which the one of the plurality of participants, who made the request, has an access right, together with the first file.

5. The information processing device according to claim 3,
wherein the processor is further configured to cause the display to display a list of messages that are transmitted to the linked messaging service for which the one of the plurality of participants, who made the request, has an access right, together with the first file.

6. The information processing device according to claim 4,
wherein the processor is further configured to cause the display to display a list of messages that are transmitted to the linked messaging service for which the one of the plurality of participants, who made the request, has an access right, together with the first file.

7. The information processing device according to claim 5,
wherein, in a case where, on the display, a fourth file for which the one of the plurality of participants, who made the request, has an access right and that is stored in a storage area different from the linked storage area is associated with a message displayed in a display area in which the message transmitted to the linked messaging service is displayed, the processor is further configured to grant an access right to the fourth file to another participant who has an access right to the message with which the fourth file is associated.

8. The information processing device according to claim 6,
wherein, in a case where, on the display, a fourth file for which the one of the plurality of participants, who made the request, has an access right and that is stored in a storage area different from the linked storage area is associated with a message displayed in a display area in which the message transmitted to the linked messaging service is displayed, the processor is further configured to grant an access right to the fourth file to another participant who has an access right to the message with which the fourth file is associated.

9. The information processing device according to claim 1,
wherein the processor is further configured to cause the display to display a fourth file for which the one of the plurality of participants, who made the request, has an access right and that is stored in a storage area different from the linked storage area in a distinguishable manner from the first file.

10. The information processing device according to claim 2,
wherein the processor is further configured to cause the display to display a fourth file for which the one of the plurality of participants, who made the request, has an access right and that is stored in a storage area different from the linked storage area in a distinguishable manner from the first file.

11. The information processing device according to claim 3,
wherein the processor is further configured to cause the display to display a fourth file for which the one of the plurality of participants, who made the request, has an access right and that is stored in a storage area different from the linked storage area in a distinguishable manner from the first file.

12. The information processing device according to claim 4,
wherein the processor is further configured to cause the display to display a fourth file for which the one of the plurality of participants, who made the request, has an access right and that is stored in a storage area different from the linked storage area in a distinguishable manner from the first file.

13. The information processing device according to claim 5,
wherein the processor is further configured to cause the display to display a fourth file for which the one of the plurality of participants, who made the request, has an access right and that is stored in a storage area different from the linked storage area in a distinguishable manner from the first file.

14. The information processing device according to claim 6,
wherein the processor is further configured to cause the display to display a fourth file for which the one of the plurality of participants, who made the request, has an access right and that is stored in a storage area different from the linked storage area in a distinguishable manner from the first file.

15. The information processing device according to claim 7,
wherein the processor is further configured to cause the display to display a fourth file for which the one of the plurality of participants, who made the request, has an access right and that is stored in a storage area different from the linked storage area in a distinguishable manner from the first file.

16. The information processing device according to claim 3,
wherein the processor is configured to cause the display to display the list of the third files in the same display area as the first file so that the third files are capable of being identified as files transmitted to the linked messaging service.

17. The information processing device according to claim 1,
wherein the processor is further configured to grant an access right to the second file to the one of the plurality of participants, who made the request, in response to a request of the one of the plurality of participants, who made the request.

18. A non-transitory computer readable medium storing a program causing a computer to execute a process for information processing, the process comprising:
associating a plurality of participants of each activity set by a user for each specific purpose with the activity;
linking, to the activity, a storage area of each of a plurality of file management services for which at least one of the plurality of participants associated with the activity has an access right and that is provided by a plurality of service providers;
in response to a request for accessing the activity from one of the plurality of participants associated with the activity, causing a display of the one of the plurality of participants, who made the request, to display a first file stored in the linked storage area for which the one of the plurality of participants, who made the request, has an access right;
causing the display to indicate a presence of a second file that is stored in a linked storage area for which the one of the plurality of participants, who made the request, does not have an access right; and
when files are displayed side by side in the display in accordance with a specific order, indicating the presence of the second file by ensuring a space at a position where the second file is to be displayed, and by preventing display of the first file in the space.

19. A process for information processing, comprising:
associating a plurality of participants of each activity set by a user for each specific purpose with the activity;
linking, to the activity, a storage area of each of a plurality of file management services for which at least one of the plurality of participants associated with the activity has an access right and that is provided by a plurality of service providers;
in response to a request for accessing the activity from one of the plurality of participants associated with the activity, causing a display of the one of the plurality of participants, who made the request, to display a first file stored in the linked storage area for which the one of the plurality of participants, who made the request, has an access right;
causing the display to indicate a presence of a second file that is stored in a linked storage area for which the one of the plurality of participants, who made the request, does not have an access right; and
when files are displayed side by side in the display in accordance with a specific order, indicating the presence of the second file by ensuring a space at a position where the second file is to be displayed, and by preventing display of the first file in the space.

* * * * *